(12) United States Patent
Kudo et al.

(10) Patent No.: US 9,798,138 B2
(45) Date of Patent: Oct. 24, 2017

(54) OPTICAL SCANNING DEVICE, IMAGE FORMING APPARATUS, AND IMAGING OPTICAL ELEMENT

(71) Applicant: CANON KABUSHIKI KAISHA, Tokyo (JP)

(72) Inventors: Genichiro Kudo, Utsunomiya (JP); Akihiro Hibino, Utsunomiya (JP); Tomoyuki Kawano, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/008,853

(22) Filed: Jan. 28, 2016

(65) Prior Publication Data

US 2016/0223812 A1    Aug. 4, 2016

(30) Foreign Application Priority Data

Jan. 30, 2015 (JP) .................. 2015-017856
Mar. 31, 2015 (JP) .................. 2015-074502
Dec. 1, 2015 (JP) .................. 2015-235238

(51) Int. Cl.
| | | |
|---|---|---|
| G03B 15/00 | (2006.01) | |
| G02B 26/12 | (2006.01) | |
| H04N 1/113 | (2006.01) | |
| H04N 1/06 | (2006.01) | |

(Continued)

(52) U.S. Cl.
CPC ......... *G02B 26/125* (2013.01); *G02B 26/123* (2013.01); *G02B 26/124* (2013.01); *G03G 15/043* (2013.01); *G03G 15/0435* (2013.01); *G03G 15/04072* (2013.01);

(Continued)

(58) Field of Classification Search
USPC .......................................................... 399/4
See application file for complete search history.

(56) References Cited

U.S. PATENT DOCUMENTS 8,797,624 B2 * 8/2014 Fujino .................. G02B 26/125
                                                            359/207.3
2002/0080458 A1    6/2002 Ishihara
(Continued)

FOREIGN PATENT DOCUMENTS

JP    H0915517 A    1/1997
JP    H10123448 A   5/1998
(Continued)

*Primary Examiner* — Rodney Fuller
(74) *Attorney, Agent, or Firm* — Canon U.S.A. Inc, IP Division

(57) ABSTRACT

An optical scanning device includes a deflector for deflecting a light beam to optically scan a scanned region on a scanned surface in a main scanning direction, and an imaging optical system for guiding the light beam deflected by the deflector, to the scanned surface. The imaging optical system includes an imaging optical element in which, in the main scanning direction, a distance to an optical axis from one effective end portion through which a light beam that enters one end portion of the scanned region passes is longer than a distance to the optical axis from another effective end portion through which a light beam that enters another end portion of the scanned region passes. In the imaging optical element, a thickness in an optical axis direction of the one effective end portion is thinner than a thickness in the optical axis direction of the other effective end portion.

17 Claims, 19 Drawing Sheets

(51) Int. Cl.
*G03G 15/043* (2006.01)
*G03G 15/04* (2006.01)

(52) U.S. Cl.
CPC ............... *H04N 1/06* (2013.01); *H04N 1/113* (2013.01); *H04N 2201/0094* (2013.01)

(56) References Cited

U.S. PATENT DOCUMENTS

| | | | | |
|---|---|---|---|---|
| 2005/0219353 | A1* | 10/2005 | Matsuo | G02B 1/118 347/244 |
| 2006/0066712 | A1* | 3/2006 | Sakai | B41J 2/473 347/244 |
| 2007/0127105 | A1* | 6/2007 | Igarashi | G02B 26/125 359/205.1 |
| 2009/0123179 | A1* | 5/2009 | Tanimura | G02B 26/123 399/151 |
| 2011/0115872 | A1* | 5/2011 | Harasaka | B41J 2/45 347/224 |
| 2011/0317234 | A1 | 12/2011 | Ominato | |
| 2012/0105570 | A1* | 5/2012 | Park | B41J 2/473 347/224 |
| 2013/0057890 | A1* | 3/2013 | Kudo | G03G 15/0409 358/1.13 |
| 2015/0035930 | A1* | 2/2015 | Ishihara | B41J 2/471 347/118 |
| 2016/0156802 | A1* | 6/2016 | Mizutani | H04N 1/113 347/258 |
| 2016/0223812 | A1* | 8/2016 | Kudo | G02B 26/125 |

FOREIGN PATENT DOCUMENTS

| | | |
|---|---|---|
| JP | H11311749 A | 11/1999 |
| JP | 2001159739 A | 6/2001 |
| JP | 2002048991 A | 2/2002 |
| JP | 2002055295 A | 2/2002 |
| JP | 2002189185 A | 7/2002 |
| JP | 2002350758 A | 12/2002 |
| JP | 2004138748 A | 5/2004 |
| JP | 2004272230 A | 9/2004 |
| JP | 2014-002335 A | 1/2014 |

* cited by examiner

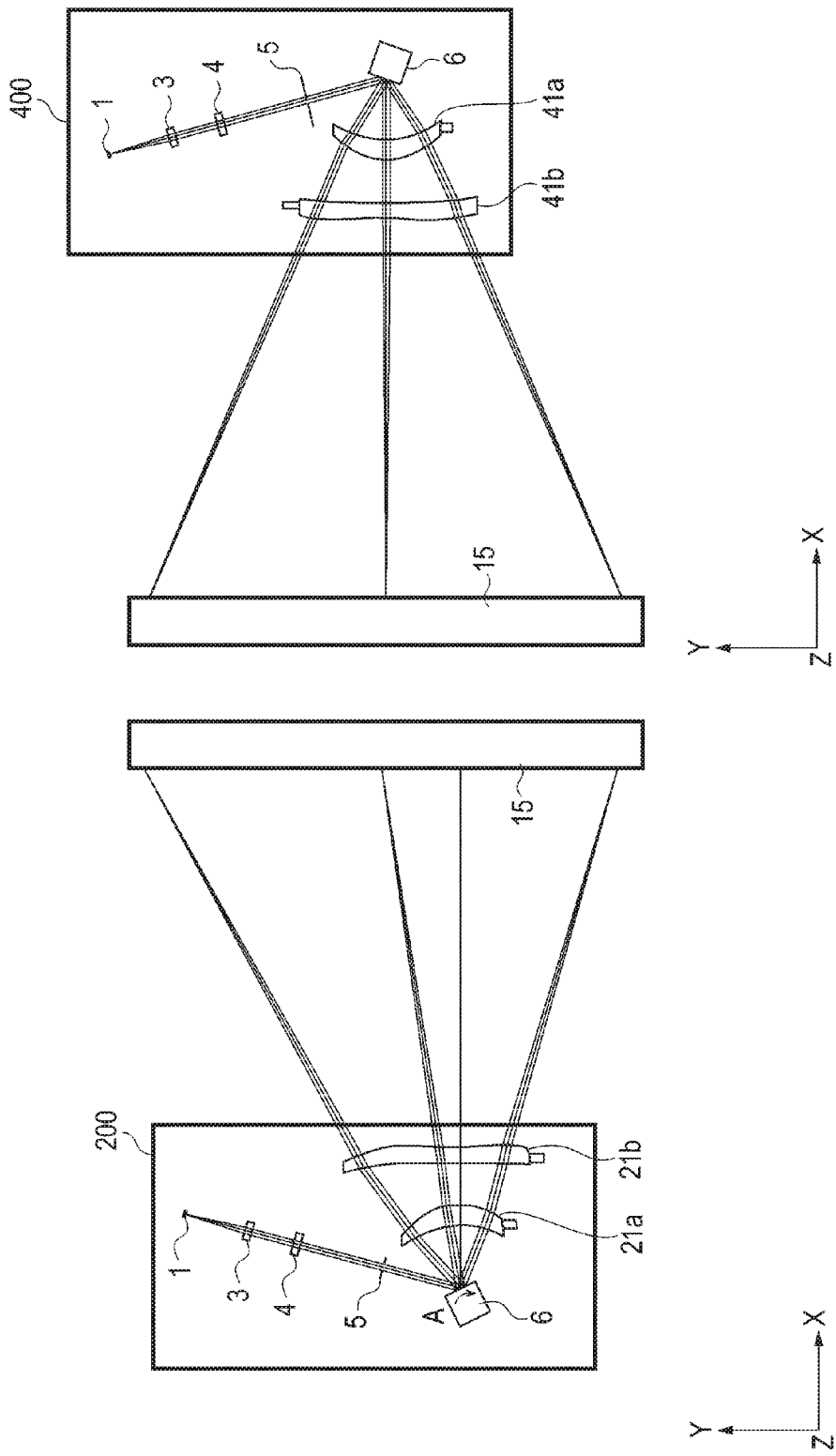

OPTICAL SCANNING DEVICE, IMAGE FORMING APPARATUS, AND IMAGING OPTICAL ELEMENT

BACKGROUND OF THE INVENTION

Field of the Invention

The present invention relates to an imaging optical element, and is suitable for an optical scanning device included in an image forming apparatus such as a laser beam printer (LBP), a digital copying machine, and a multifunction printer, for example.

Description of the Related Art

As an optical scanning device included in an image forming apparatus, there has been conventionally known the one that optically scans a scanned surface in a main scanning direction by deflecting light beams emitted from a light source, using a deflector, and guiding the deflected light beams to the scanned surface using an imaging optical element. Japanese Patent Application Laid-Open No. 2002-189185 describes an optical scanning device that includes an imaging optical element arranged closer to a deflector, and sets a scanning field angle to a wide field angle for downsizing the entire device.

In the optical scanning device described in Japanese Patent Application Laid-Open No. 2002-189185, however, a light source unit is arranged with protruding in a main scanning direction. That is, the downsizing in the main scanning direction is not considered in the technique. In addition, if the light source unit and a cylindrical lens are brought closer to a deflection means, the optical scanning device described in Japanese Patent Application Laid-Open No. 2002-189185 can be downsized. Nevertheless, if the cylindrical lens is brought closer to the deflection means, an F-number in a sub-scanning cross section needs to increased, so that a sufficient light amount cannot be ensured on a scanned surface.

SUMMARY OF THE INVENTION

The present invention aims to provide an optical scanning device, an image forming apparatus, and an imaging optical element that can achieve downsizing in a main scanning direction while ensuring a sufficient light amount on a scanned surface.

For achieving the above-described purpose, an optical scanning device according to an aspect of the present invention includes a deflector configured to deflect a light beam to optically scan a scanned region on a scanned surface in a main scanning direction, and an imaging optical system configured to guide the light beam deflected by the deflector, to the scanned surface. The imaging optical system includes an imaging optical element in which, in the main scanning direction, a distance to an optical axis from one effective end portion through which a light beam that enters one end portion of the scanned region passes is longer than a distance to the optical axis from another effective end portion through which a light beam that enters another end portion of the scanned region passes. In the imaging optical element, a thickness in an optical axis direction of the one effective end portion is thinner than a thickness in the optical axis direction of the other effective end portion.

Further features of the present invention will become apparent from the following description of exemplary embodiments (with reference to the attached drawings).

BRIEF DESCRIPTION OF THE DRAWINGS

FIGS. 4A and 4B are main-scanning cross-sectional views of optical scanning devices according to a second exemplary embodiment and a comparative example of the present invention, respectively.

DESCRIPTION OF THE EMBODIMENTS

Figure 1:
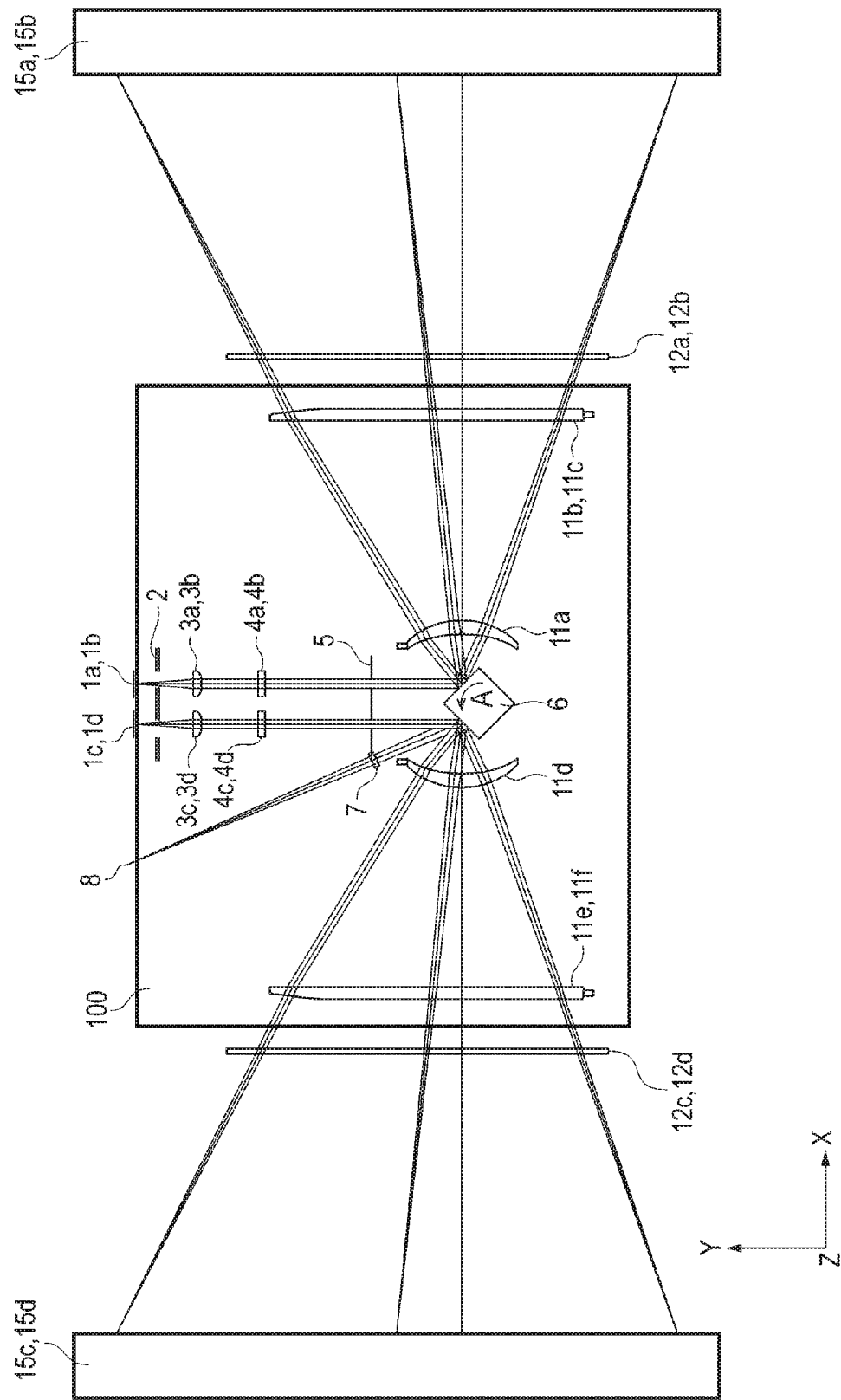
FIG. 1 is a main-scanning cross-sectional view of an optical scanning device according to a first exemplary embodiment of the present invention.

Preferred exemplary embodiments of the present invention will be described below with reference to the drawings. In addition, each drawing may be drawn in a scale different from the actual scale for descriptive purposes. In addition, in the drawings, the same components are assigned the same reference numeral, and the redundant description thereof will be omitted.

In the following description, a main scanning direction refers to a direction vertical to a rotational axis (or swinging motion axis) of the deflector and to an optical axis direction (i.e., a direction in which a scanned surface is scanned by a deflector). A sub scanning direction refers to a direction parallel to the rotational axis (or swinging motion axis) of the deflector. In addition, a main-scanning cross section refers to a cross section vertical to the sub scanning direction (i.e., a cross section including the main scanning direction and the optical axis). A sub-scanning cross section refers to a cross section vertical to the main scanning direction (i.e., a cross section including the sub scanning direction and the optical axis). In addition, the optical axis of an imaging optical system corresponds to a principal ray that is deflected by a deflector to vertically enter a scanned surface.

First Exemplary Embodiment

Figure 2:
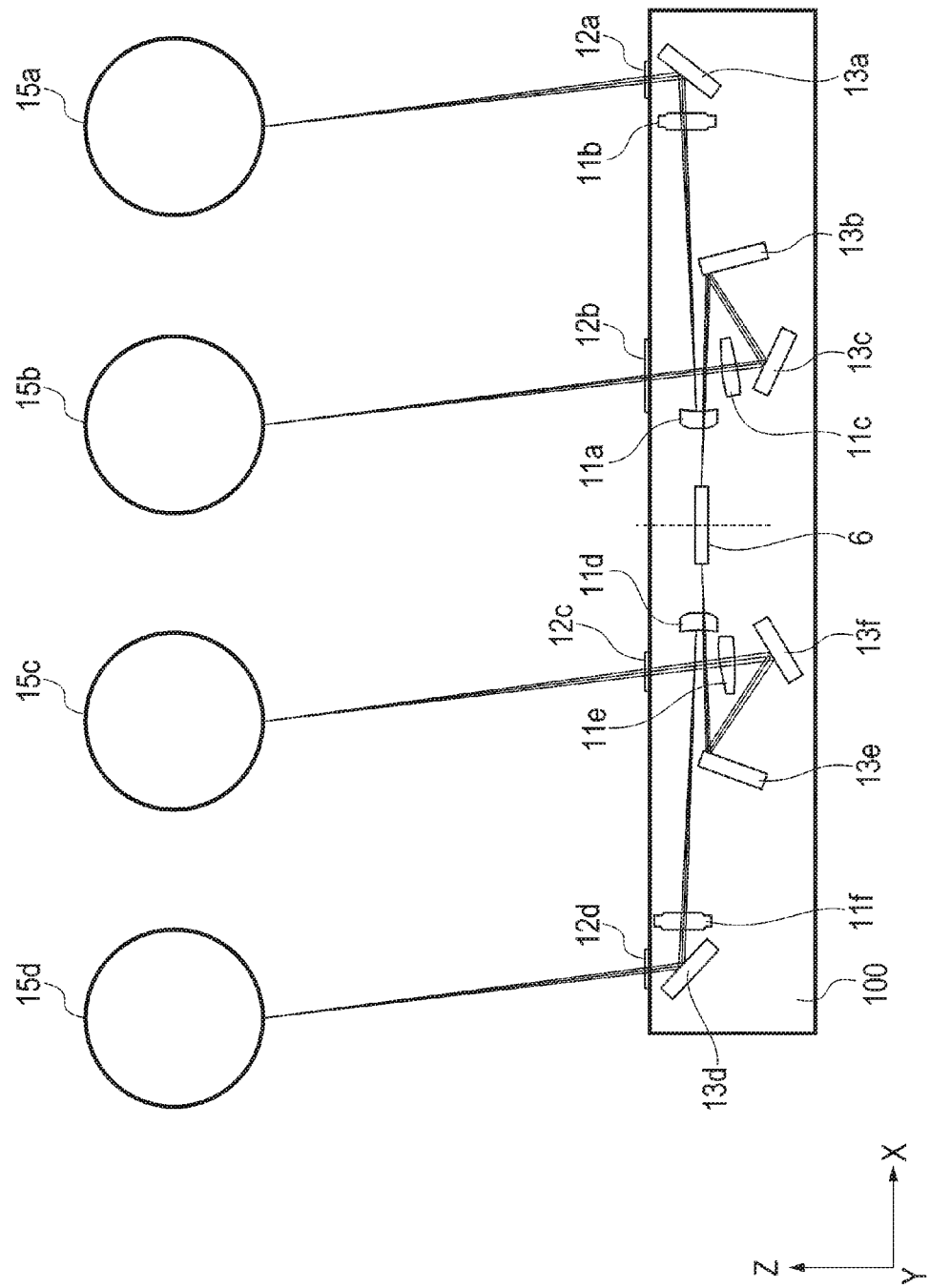
FIG. 2 is a sub-scanning cross-sectional view of the optical scanning device according to the first exemplary embodiment of the present invention.

FIGS. 1 and 2 are main part schematic views of an optical scanning device 100 according to the first exemplary embodiment of the present invention. FIG. 1 illustrates a main-scanning cross-sectional view (XY cross-sectional view) and FIG. 2 illustrates a sub-scanning cross-sectional view (ZX cross-sectional view).

The optical scanning device 100 according to the present exemplary embodiment includes light sources 1a to 1d, a sub-scanning diaphragm 2, collimator lenses 3a to 3d, cylindrical lenses 4a to 4d, and a main-scanning diaphragm 5. The optical scanning device 100 further includes a deflector 6, a BD lens 7, a BD sensor 8, imaging optical elements 11a to 11f, dust protective glasses 12a to 12d, and mirrors 13a to 13f. In the present exemplary embodiment, the light sources 1a to 1d, the sub-scanning diaphragm 2, the collimator lenses 3a to 3d, the cylindrical lenses 4a to 4d, and the main-scanning diaphragm 5 constitute an incident optical system, and the imaging optical elements 11a to 11f and the mirrors 13a to 13f constitute an imaging optical system.

The light sources 1a to 1d each include a semiconductor laser having four light emitting points LD1, LD2, LD3, and LD4. In other words, the optical scanning device 100 includes 16 light emitting points in total. The sub-scanning diaphragm 2 includes rectangular apertures 2a, 2b, 2c, and 2d to regulate a light beam width in a Z direction of each light beam emitted from the light sources 1a to 1d. The collimator lenses 3a to 3d convert light beams emitted from the light sources 1a to 1d into light beams approximately-parallel both in the main-scanning cross section and in the sub-scanning cross section. The cylindrical lenses 4a to 4d are plastic mold lenses having refractive power only in the sub-scanning cross section.

In addition, the main-scanning diaphragm 5 includes a rectangular aperture 5a for regulating a light beam width in the main scanning direction of the light beams emitted from the light sources 1a and 1b, a rectangular aperture 5b for regulating a light beam width in the main scanning direction of the light beams emitted from the light sources 1c and 1d. The apertures 5a and 5b each have a shape with one end portion (upper portion) in the sub scanning direction being opened. The deflector 6 according to the present exemplary embodiment is a polygon mirror (rotating polygon mirror), and is rotated by a driving means (not illustrated) such as a motor at a constant speed in a direction indicated by an arrow A in FIG. 1.

The imaging optical elements 11a to 11f are fθ lenses (scanning lenses) having fθ characteristics, and condense light beams onto scanned regions (image forming regions) on scanned surfaces 15a to 15d to form spot images thereon. The imaging optical elements 11a to 11f perform optical face tangle error correction of the deflector 6 by causing a deflecting surface of the deflector 6 or a neighboring position thereof and the scanned surfaces 15a to 15d or neighboring positions thereof to be in a substantially-conjugate relationship in the sub-scanning cross section. The dust protective glasses 12a to 12d are plate glasses having no power and provided for preventing foreign substances such as toner from getting into the optical scanning device 100.

An optical path from the light source 1d to the scanned surface 15d will now be described as an example. The light beam emitted from the light source 1d is regulated by the aperture 2d of the sub-scanning diaphragm 2 and the aperture 5b of the main-scanning diaphragm 5. In addition, the light beam emitted from the light source 1d is converted into an approximately parallel light beam by the collimator lens 3d, and then condensed by the cylindrical lens 4d only in the sub-scanning cross section. A line image longer in the main scanning direction is thereby formed on the deflecting surface of the deflector 6.

Then, the light beams deflected on the deflecting surface of the deflector 6 are condensed onto the scanned surface 15d by the imaging optical elements 11d and 11e, so that spots are formed thereon. At this time, by rotating the deflector 6 in the direction indicated by the arrow A, the scanned surface 15d can be optically scanned at a constant speed in the main scanning direction, so that an image can be recorded onto the scanned surface 15d. The same applies to the other optical paths.

In the optical scanning device 100, before scanning the scanned surface 15d, it is necessary to determine a timing at which each light beam falls on a scanning start position on the scanned surface 15d (writing start timing). Thus, the light emission timings of the light emitting points LD1 to LD4 in each light source are determined by guiding the light beams deflected by the deflector 6 to the BD sensor 8 via the BD lens 7, and using synchronization signals (BD signals) obtained by detecting output signals from the BD sensor 8.

In the present exemplary embodiment, the positions in the optical axis direction of the apertures 5a and 5b of the main-scanning diaphragm 5 are set so that an interval in the main scanning direction on the deflecting surface between light beams emitted from the light emitting points LD1 and LD4 becomes small. This can reduce deviation in dot position on the scanned surfaces 15a to 15d that arises when a focus position of the imaging optical elements 11a to 11f in the main-scanning cross section deviates.

The light emitting points LD1 to LD4 according to the present exemplary embodiment are one-dimensionally arrayed at intervals of approximately 30 μm, and separated from one another at an equal interval both in the main scanning direction and the sub scanning direction. In addition, the light emitting points LD1 to LD4 are arrayed with a tilt according to the resolution in the sub scanning direction that is required of an image forming apparatus. The light emitting points LD1 to LD4 are configured to be rotatable about an optical axis for adjusting an interval in the sub scanning direction.

In addition, the light beam emitted from the light emitting point LD4 and the light beam emitted from the light emitting point LD1 are different from each other in incident angle with respect to the scanned surfaces 15a to 15d. Thus, on the scanned surfaces 15a to 15d, the light beam from the light emitting point LD1 is the leading light beam on the scanning downstream side (scanning front side) in the main scanning direction, and the light beam from the light emitting point LD4 is the last light beam on the scanning upstream side (scanning rear side) in the main scanning direction. In addition, the optical scanning device 100 is configured to determine the light emission timing of each light emitting point by detecting a light beam(s) from at least one of the light emitting points LD1 to LD4. The present exemplary embodiment employs a configuration of detecting only the light beam from the light emitting point LD4 that is a light beam on the most scanning rear side.

In addition, in the present exemplary embodiment, the BD lens 7 and the BD sensor 8 are arranged on the side (incident side) where the incident optical system is arranged, with respect to the optical axis, and the substrate of the light sources 1a to 1d and the substrate of the BD sensor 8 are integrally formed. With this configuration, the number of components is reduced, and the device is downsized. Furthermore, by employing the configuration of performing BD detection using a light beam not passing through each imaging optical element, the size of the imaging optical element can be reduced.

In each of the collimator lenses 3a to 3d according to the present exemplary embodiment, an incident surface has a planar surface shape, and a light emitting surface has a spherical surface shape. With this configuration, the collimator lenses 3a to 3d convert light beams into approximately-parallel light beams, and reduce deviation in focus position on the scanned surface between light beams emitted from the respective light emitting points, so that a difference in spot diameter can be prevented from being caused. In addition, the cylindrical lenses 4a to 4d according to the present exemplary embodiment are formed of an integrated plastic mold. In addition, in FIG. 1, the cylindrical lenses are drawn in a separated manner for descriptive purposes. The respective incident surfaces of the cylindrical lenses 4a to 4d each have a diffractive surface. With this configuration, spot diameter variation due to environmental temperature fluctuation can be suppressed. The phase function of each diffractive surface can be represented by the following expression:

$$\Phi(y, z) = \frac{2\pi}{m\lambda}\{(E_1 y + E_2 y^2 + E_3 y^3 + \ldots + E_{10} y^{10}) + \qquad \text{[Math. 1]}$$
$$z^2(F_0 + F_1 y + F_2 y^2 + F_3 y^3 + \ldots + F_{10} y^{10})\}$$

where, m represents a diffraction order, $E_1$ to $E_{10}$ and $F_0$ to $F_{10}$ represent phase coefficients, and the term related to $F_0$ to $F_{10}$ corresponds to a term representing power in the sub-scanning cross section. In the present exemplary embodiment, the diffraction order m is set to 1. Thus, refractive index variation and wavelength variation that arise when temperature rises are canceled using primary diffracted light.

The imaging optical system according to the present exemplary embodiment includes a first imaging optical element having refractive power mainly in the main-scanning cross section, and a second imaging optical element having refractive power mainly in the sub-scanning cross section. The first imaging optical element 11a is arranged so that two light beams being deflected by a first deflecting surface of the deflector 6 and respectively reaching the two different scanned surfaces 15a and 15b pass therethrough in common. Similarly, the first imaging optical element 11d is arranged so that two light beams being deflected by a second deflecting surface of the deflector 6 and respectively reaching the two different scanned surfaces 15c and 15d pass therethrough in common.

In addition, the second imaging optical elements 11b and 11c are arranged in the respective optical paths between the first imaging optical element 11a and the respective dust protective glasses 12a and 12b. Similarly, the second imaging optical elements 11e and 11f are arranged in the respective optical paths between the first imaging optical element 11d and the respective dust protective glasses 12c and 12d. The second imaging optical elements each have such a decentered shape that an optical axis is positioned with being shifted by 5 mm with respect to a profile center in the sub scanning direction. With this configuration, each height in the sub scanning direction can be lowered.

The shape of the optical surface (lens surface) of each of the imaging optical elements 11a to 11f in the main-scanning cross section is represented by a function indicated by the following expressions:

$$x = \frac{y^2/R}{1 + \sqrt{1-(1+K)(y/R)^2}} + \qquad \text{[Math. 2]}$$
$$B_{4s}y^4 + B_{6s}y^6 + B_{8s}y^8 + B_{10s}y^{10},$$
and $$x = \frac{y^2/R}{1 + \sqrt{1-(1+K)(y/R)^2}} + B_{4e}y^4 + B_{6e}y^6 + B_{8e}y^8 + B_{10e}y^{10}. \qquad \text{[Math. 3]}$$

In these expressions, an intersection point of each optical surface and an optical axis is set as an origin, an optical axis is set as an X axis, an axis orthogonal to the optical axis in the main-scanning cross section is set as a Y axis, and an axis orthogonal to the optical axis in the sub-scanning cross section is set as a Z axis. In addition, R represents curvature radius, K, $B_4$, $B_6$, $B_8$, and $B_{10}$ represent aspheric surface coefficients, and suffixes s and e of each coefficient represent a scanning start side and a scanning end side, respectively. In the present exemplary embodiment, the respective aspheric surface coefficients on the scanning start side and the scanning end side match with each other. Thus, designed configuration of the imaging optical elements 11a to 11f in the main-scanning cross section is symmetrical with respect to the optical axis.

On the other hand, the shape of each of the imaging optical elements 11a to 11f in the sub-scanning cross section is represented by the following expressions:

$$S = \frac{z^2/r'}{1 + \sqrt{1-(z/r')^2}} + \sum_{j=0}^{16}\sum_{k=1}^{8} M_{jk}Y^j Z^k \qquad \text{[Math. 4]}$$
$$r' = r(1 + D_{2s}y^2 + D_{4s}y^4 + D_{6s}y^6 + D_{8s}y^8 + D_{10s}y^{10}),$$
and $$S = \frac{z^2/r'}{1 + \sqrt{1-(z/r')^2}} + \sum_{j=0}^{16}\sum_{k=1}^{8} M_{jk}Y^j Z^k \qquad \text{[Math. 5]}$$
$$r' = r(1 + D_{2e}y^2 + D_{4e}y^4 + D_{6e}y^6 + D_{8e}y^8 + D_{10e}y^{10}).$$

In these expressions, r' represents curvature radius in the sub-scanning cross section, r represents curvature radius on an axis in the sub-scanning cross section, $D_2$, $D_4$, $D_6$, $D_8$, and $D_{10}$ represent aspheric surface coefficients, and suffixes s and e of each coefficient represent the scanning start side and the scanning end side, respectively. In the sub-scanning cross section, curvatures of incident surfaces and light emitting surfaces of the imaging optical elements 11b, 11c, 11e, and 11f are consecutively changed from the scanning start side to the scanning end side. At this time, by consecutively changing a primary term of Z as a function of Y, each surface can be consecutively tilted from on-axis to off-axis. As a result, spot deterioration and curvature of a scanning line can be both reduced.

In addition, the imaging optical elements 11a to 11f according to the present exemplary embodiment are formed of plastic lenses having power. With this configuration, weight reduction is achieved. Furthermore, using an aspheric surface can improve flexibility in the design aspect. In addition, the imaging optical elements 11a to 11f may be made of glass. Furthermore, the imaging optical elements 11a to 11f may be optical elements having diffraction power. In addition, in the present exemplary embodiment, each optical path is provided with two imaging optical elements.

The configuration of the optical path, however, is not limited thereto, and a configuration including one imaging optical element or three or more imaging optical elements may be employed.

Table 1 shows each numerical value related to the optical scanning device 100 according to the present exemplary embodiment. In Table 1, an incident angle in each cross section indicates an incident angle at which a light beam emitted from the incident optical system enters the deflecting surface of the deflector 6, and a focal length of the imaging optical system indicates a value on the optical axis. A rotation center coordinate is indicated with an origin set to an intersection point of the deflector 6 and a principal ray with an image height of 0 (i.e., on-axis) (i.e., on-axis deflection point). In addition, a scan angle of the deflector 6 indicates a rotation angle (absolute value) of the deflector 6, at which the deflector 6 deflects an outermost off-axis light beam, when a rotation angle at which the deflector 6 deflects an on-axis light beam is set to 0°. In Table 1, r represents curvature radius, d represents a surface interval, and N represents refractive index.

TABLE 1

| | |
|---|---|
| USED WAVELENGTH (mm) | 7.90E−07 |
| REFRACTIVE INDEX OF IMAGING OPTICAL ELEMENTS 11a TO 11f | 1.529 |
| NUMBER OF DEFLECTING SURFACES OF DEFLECTOR 6 | 4 |
| CIRCUMSCRIBED CIRCLE DIAMETER OF DEFLECTOR 6 (mm) | 20 |
| INCIDENT SIDE SCAN ANGLE OF DEFLECTOR 6 (deg.) | 19.1 |
| ANTI-INCIDENT SIDE SCAN ANGLE OF DEFLECTOR 6 (deg.) | 10.9 |
| INCIDENT ANGLE IN MAIN-SCANNING CROSS SECTION (deg.) | 90 |
| INCIDENT ANGLE IN SUB-SCANNING CROSS SECTION (deg.) | 2.7 |
| ON-AXIS DEFLECTION POINT - INCIDENT SURFACES OF FIRST IMAGING OPTICAL ELEMENTS 11a AND 11d (mm) | 2.00E+01 |
| MAIN-SCANNING FOCAL LENGTH OF IMAGING OPTICAL SYSTEM (mm) | 2.10E+02 |

ROTATION CENTER COORDINATE OF DEFLECTOR

| | |
|---|---|
| X | −5.500 |
| Y | −4.500 |

INCIDENT OPTICAL SYSTEM

| | r | d | N (790 nm) |
|---|---|---|---|
| LIGHT SOURCE (LIGHT EMITTING POINT) | 0.0000 | 9.9500 | 0.0000 |
| SUB-SCANNING DIAPHRAGM | | 13.3980 | |
| COLLIMATOR LENS | 0.0000 | 3.0000 | 1.7617 |
| | −19.0457 | 22.2820 | 0.0000 |
| CYLINDRICAL LENS*1 | 58.6205 | 3.0000 | 1.5240 |
| | 0.00 | 41.2010 | 1.0000 |
| MAIN-SCANNING DIAPHRAGM | | 40.0000 | |
| DEFLECTING SURFACE | 0.0000 | 0.0000 | −1.0000 |

*1 PHASE FUNCTION OF CYLINDRICAL LENS
PHASE COEFFICIENT

| | |
|---|---|
| F0 | −2.00E−03 |
| F1 | 0.00E+00 |
| F2 | 0.00E+00 |
| F3 | 0.00E+00 |
| F4 | 0.00E+00 |
| F5 | 0.00E+00 |
| F6 | 0.00E+00 |

IMAGING OPTICAL SYSTEM

| | | R1 SURFACE | | R2 SURFACE | |
|---|---|---|---|---|---|
| | | INCIDENT SIDE (s) | ANTI-INCIDENT SIDE (e) | INCIDENT SIDE (s) | ANTI-INCIDENT SIDE (e) |
| MAIN-SCANNING CROSS SECTION | d | 5.00E+00 | | 7.910E+01 | |
| | R | −3.80E+01 | | −2.90E+01 | |
| | K | −3.96E−01 K | −3.96E−01 | K −1.62E+00 K | −1.62E+00 |
| | B4 | 6.41E−06 B4 | 6.41E−06 | B4 −1.99E−06 B4 | −1.99E−06 |

TABLE 1-continued

|  |  |  |  |  |  |  |  |  |
|---|---|---|---|---|---|---|---|---|
|  | B6 | −7.99E−09 | B6 | −7.99E−09 | B6 | −1.02E−09 | B6 | −1.02E−09 |
|  | B8 | −9.00E−12 | B8 | −9.00E−12 | B3 | −5.99E−12 | B8 | −5.99E−12 |
|  | B10 | 0.00E+00 | B10 | 0.00E+00 | B10 | −1.41E−14 | B10 | −1.41E−14 |
| SUB-SCANNING | r | 2.00E+01 |  |  | r | 2.00E+01 |  |  |
| CROSS SECTION | D2 | 0.00E+00 | D2 | 0.00E+00 | D2 | −6.30E−04 | D2 | −5.25E−04 |
|  | D4 | 0.00E+00 | D4 | 0.00E+00 | D4 | 1.81E−06 | D4 | 1.49E−06 |
|  | D6 | 0.00E+00 | D6 | 0.00E+00 | D6 | −2.28E−09 | D6 | −1.78E−09 |
|  | D8 | 0.00E+00 | D8 | 0.00E+00 | D8 |  | D8 |  |
|  | D10 | 0.00E+00 | D10 | 0.00E+00 | D10 |  | D10 |  |

|  |  | R3 SURFACE | | R4 SURFACE | |
|---|---|---|---|---|---|
|  |  | INCIDENT SIDE (s) | ANTI-INCIDENT SIDE (e) | INCIDENT SIDE (s) | ANTI-INCIDENT SIDE (e) |
| MAIN-SCANNING | d |  | 4.50E+00 | d |  | 1.31E+02 |
| CROSS SECTION | R |  | −2.09E+03 | R |  | 1.34E+03 |
|  | K | 0.00E+00 | K | 0.00E+00 | K | −2.15E+03 | K | −2.15E+03 |
|  | B4 | 0.00E+00 | B4 | 0.00E+00 | B4 | −2.41E−07 | B4 | −2.41E−07 |
|  | B6 | 0.00E+00 | B6 | 0.00E+00 | B6 | 2.27E−11 | B6 | 2.27E−11 |
|  | B8 | 0.00E+00 | B8 | 0.00E+00 | B8 | −1.68E−15 | B8 | −1.68E−15 |
|  | B10 | 0.00E+00 | B10 | 0.00E+00 | B10 | 5.50E−20 | B10 | 5.50E−20 |
| SUB-SCANNING | r | 6.78E+01 |  |  | r | −5.44E+01 |  |  |
| CROSS SECTION | D2 | 0.00E+00 | D2 | 0.00E+00 | D2 | 1.27E−04 | D2 | 1.32E−4 |
|  | D4 | 0.00E+00 | D4 | 0.00E+00 | D4 | −7.39E−09 | D4 | −7.62E−09 |
|  | D6 | 0.00E+00 | D6 | 0.00E+00 | D6 | 2.07E−12 | D6 | 2.28E−12 |
|  | D8 | 0.00E+00 | D8 | 0.00E+00 | D3 | −3.43E−16 | D8 | −3.64E−16 |
|  | D10 | 0.00E+00 | D10 | 0.00E+00 | D10 | 3.09E−20 | D10 | 3.41E−20 |
| ADDITIONAL | m01 |  | 5.56E−02 | m01 |  | −1.69E−02 |
| TERM | m11 |  | 3.34E−06 | m11 |  | −1.54E−06 |
|  | m21 |  | −2.89E−06 | m21 |  | 2.30E−06 |
|  | m31 |  | 4.41E−09 | m31 |  | 2.18E−09 |
|  | m41 |  | 4.54E−10 | m41 |  | −1.04E−10 |
|  | m51 |  | −6.83E−12 | m51 |  | −3.71E−12 |
|  | m61 |  | −1.40E−13 | m61 |  | −4.84E−14 |
|  | m71 |  | 2.93E−15 | m71 |  | 1.12E−15 |
|  | m81 |  | 8.45E−18 | m81 |  | 5.51E−18 |
|  | m91 |  | −6.42E−19 | m91 |  | −8.49E−20 |
|  | m101 |  | 8.46E−22 | m101 |  | −2.04E−21 |
|  | m111 |  | 2.68E−23 | m111 |  | −4.98E−23 |
|  | m121 |  | 2.09E−25 | m121 |  | 5.49E−25 |
|  | m131 |  | 0.00E+00 | m131 |  | 5.49E−27 |
|  | m141 |  | 0.00E+00 | m141 |  | 0.00E+00 |
|  | m151 |  | 0.00E+00 | m151 |  | 0.00E+00 |
|  | m161 |  | 0.00E+00 | m161 |  | 0.00E+00 |

In Table 1, "E-x" indicates "10-x". An R1 surface indicates a surface on the deflector side (incident surface) of the first imaging optical element, and an R2 surface indicates a surface on the scanned surface side (light emitting surface) of the first imaging optical element. In addition, an R3 surface indicates a surface on the deflector side (incident surface) of the second imaging optical element, and an R4 surface indicates a surface on the scanned surface side (light emitting surface) of the second imaging optical element.

Figure 3A:
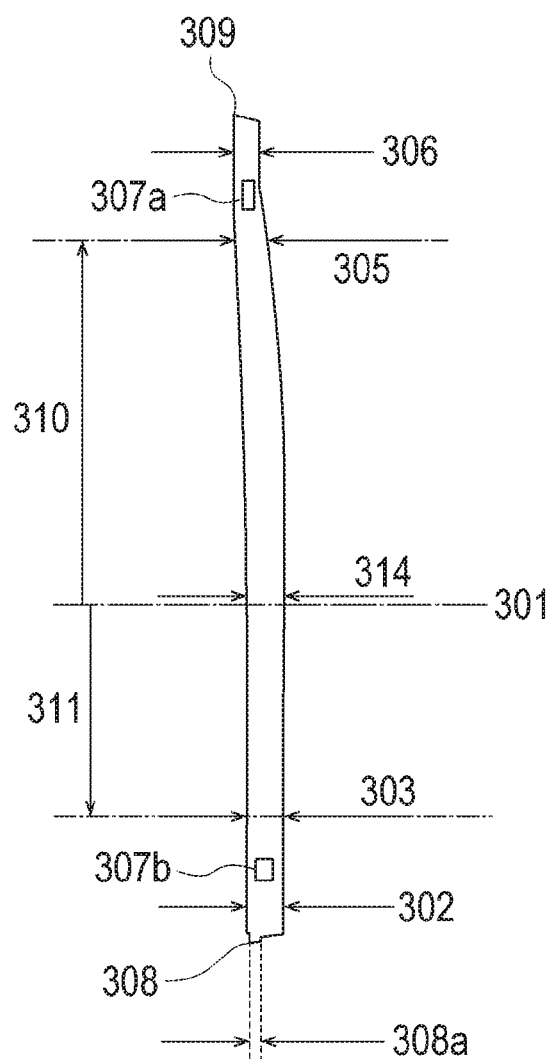
FIGS. 3A and 3B are main part schematic views of a second imaging optical element according to the first exemplary embodiment of the present invention.
Figure 3B:
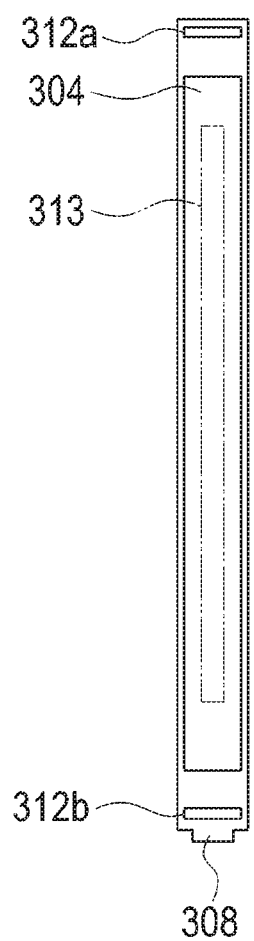

FIGS. 3A and 3B are main part schematic views of the second imaging optical element according to the present exemplary embodiment. FIG. 3A is a top view and FIG. 3B is a side view (incident surface side). As illustrated in FIGS. 3A and 3B, the second imaging optical element includes an optical surface 304 defined by the above-described expression, and outer end portions (flange portions) provided on both side of the optical surface 304 in the main scanning direction. Herein, the "optical surface" refers to contiguous curved surface defined by the same definition expression in the main-scanning cross section, and the "flange portion" refers to a portion including a non-optical surface and being provided outside the optical surface.

In FIG. 3B, an effective portion 313 defined by a dashed-two dotted line corresponds to a region on the optical surface 304 of the second imaging optical element, through which an effective light beam contributing to image forming (i.e., used for optical scanning of a scanned surface) passes. In other words, the "effective portion" here refers to a region corresponding to a scanned region on the scanned surface, and an end portion of the effective portion (effective end portion) corresponds to a portion through which an outermost off-axis light beam headed for an end portion of the scanned region (maximum off-axis image height) passes.

The second imaging optical element according to the present exemplary embodiment has such a configuration that, in the main scanning direction, a distance from an optical axis to one effective end portion is longer than a distance from the optical axis to the other effective end portion, and a thickness in one effective end portion is thinner than a thickness in the other effective end portion. In other words, the second imaging optical element according to the present exemplary embodiment has such a shape that, in the main scanning direction, a length of the effective portion 313 (an effective length) and a thickness in an effective end portion (an effective thickness) are asymmetric with respect to the optical axis.

Specifically, as illustrated in FIG. 3A, in the effective portion 313 of the second imaging optical element, an effective length 310 on an incident side is longer than an effective length 311 on the opposite side of the incident side (anti-incident side), with respect to an optical axis 301. Furthermore, in the effective portion 313 of the second imaging optical element, an effective thickness 305 on the incident side is thinner than an effective thickness 303 on the anti-incident side, with respect to the optical axis 301. In the present exemplary embodiment, unless otherwise specified, the "thickness" refers to a width (length) in an optical axis direction.

By employing the shape as illustrated in FIGS. 3A and 3B as the shape of each second imaging optical element, the optical scanning device 100 according to the present exemplary embodiment can have such a configuration that a scanning field angle and a scanning width (width of a scanned region) on the incident side are different from those on the anti-incident side. With this configuration, the length of the second imaging optical element can be shortened as compared with the one having a shape symmetric with respect to the optical axis. In addition, each imaging optical system can be arranged with being shifted toward the anti-incident side as compared with the configuration in which a scanning field angle is symmetric with respect to the optical axis. Specifically, the imaging optical system according to the present exemplary embodiment is arranged so that an optical axis thereof is at a position shifted by 30 mm toward the anti-incident side with respect to a perpendicular bisector of the scanned surface (center position in the main scanning direction).

In the present exemplary embodiment, unless otherwise specified, the "thickness" refers to a width (length) in an optical axis direction. In addition, the "scanning field angle" refers to an angle formed by a principal ray of the outermost off-axis light beam obtained immediately after the deflection on the deflecting surface of the deflector 6, and the optical axis of the imaging optical system, i.e., a double value of a scan angle of the deflector 6. In other words, a scan angle of the deflector 6 is a half value of a scanning field angle.

In the optical scanning device 100 according to the present exemplary embodiment, by employing such a configuration, a light source, an incident optical system, and a deflector can be arranged with each being shifted toward the anti-incident side, as compared with a configuration in which a scanning field angle is symmetric with respect to the optical axis, without changing the configuration of the incident optical system. With this configuration, the optical scanning device 100 can be downsized in the main scanning direction while ensuring a sufficient light amount on the scanned surface.

In the present exemplary embodiment, among imaging optical elements constituting each imaging optical system, the second imaging optical element arranged closest to the scanned surface side is configured to have a shape asymmetric with respect to the optical axis in the main-scanning cross section. By employing an asymmetric shape as the shape of the longest imaging optical element, the entire length can be made further shorter than that of an imaging optical element having a symmetric shape, as compared with a case in which an asymmetric shape is employed as the shape of other imaging optical elements. With this configuration, the material cost of the imaging optical element can be significantly reduced.

In addition, the optical scanning device 100 according to the present exemplary embodiment desirably satisfies the following Conditional Expression (1):

$$0.6 \times D_A/D_B < \gamma < 1.4 \times D_A/D_B \quad (1),$$

where a half value of a scanning field angle on the incident side is represented by A, a half value of a scanning field angle on the anti-incident side is represented by B, an effective thickness on the incident side is represented by $D_A$, an effective thickness on the anti-incident side is represented by $D_B$, and $\gamma = B/A$.

If these values fall outside the range defined by Conditional Expression (1), when the second imaging optical element is formed through injection molding, the fluidity of resin material is reduced within a mold, and a weld line or the like may occur, which is not preferable. In the present exemplary embodiment, the half value A of the scanning field angle on the incident side is A=19.1°, the half value B of the scanning field angle on the anti-incident side is B=10.9°, the effective thickness $D_A$ on the incident side is $D_A$=2.81 mm, and the effective thickness $D_B$ on the anti-incident side is $D_B$=4.76 mm, so that these values satisfy Conditional Expression (1).

In addition, as illustrated in FIG. 3A, in the second imaging optical element according to the present exemplary embodiment, a thickness 302 of a flange portion (flange thickness) on the anti-incident side is thicker than a flange thickness 306 on the incident side, with respect to the optical axis 301. In addition, the flange portion according to the present exemplary embodiment is rectangular when viewed in the main scanning direction. The shape of the flange portion, however, is not limited to this, and the flange portion may have a shape with an ununiform thickness in the sub scanning direction, such as the one being a trapezoid or an H shape when viewed in the main scanning direction. In this case, the thickness of the thickest portion in the flange portion is regarded as a flange thickness.

In this case, it is desirable to satisfy the following Conditional Expression (2):

$$0.6 \times d_A/d_B < \gamma < 1.4 \times d_A/d_B \quad (2),$$

where a flange thickness on the incident side is represented by $d_A$, and a flange thickness on the anti-incident side is represented by $d_B$.

If these values fall outside the range defined by Conditional Expression (2), when the second imaging optical element is formed through the injection molding, variation in surface accuracy of the optical surface cannot be sufficiently reduced, and variations in spot diameter and scanning width may occur on the scanned surface, which is not preferable. In the present exemplary embodiment, the flange thickness $d_A$ on the incident side is $d_A$=3.85 mm, and the flange thickness $d_B$ on the anti-incident side is $d_B$=6.15 mm, so that these values satisfy Conditional Expression (2).

As illustrated in FIG. 3A, in the second imaging optical element according to the present exemplary embodiment, a gate portion 308, through which the resin material is flown into a mold during the injection molding, is provided at an end portion on the side where an effective thickness and a flange thickness are thicker in the main scanning direction (longitudinal direction). With this configuration, the resin material can be smoothly flown into the mold during the injection molding, so that the occurrence of a weld line or the like can be suppressed.

In addition, it is desirable to satisfy the following Conditional Expression (3):

$$Dc < De \quad (3),$$

where a thickness 308a of the gate portion 308 (gate thickness) is represented by Dc, and an effective thickness on the side of the gate portion 308 (gate side) is represented by De.

If the values fall outside the range defined by Conditional Expression (3), when the second imaging optical element is formed through the injection molding, the fluidity of resin material is reduced within the mold, and a weld line may occur, which is not preferable. In the present exemplary embodiment, the gate thickness Dc is Dc=2.5 mm, and the effective thickness De on the gate side is De=$D_B$=4.76 mm, so that these values satisfy Conditional Expression (3). In addition, in the present exemplary embodiment, an effective thickness Dd on the opposite side of the gate portion 308 (anti-gate side) with respect to the optical axis is Dd=$D_A$=2.81 mm, so that this value satisfies Dc<Dd<De.

As illustrated in FIG. 3B, on the incident surface side, the flange portions of the second imaging optical element are provided with reference portions (X reference portions) 312a and 312b for positioning the second imaging optical element in the optical axis direction. In the present exemplary embodiment, a reference surface of the reference portion 312a provided at the flange portion on the incident side is shifted by 0.75 mm toward the deflector 6 side with respect to a reference surface of the reference portion 312b provided at the flange portion on the anti-incident side. In other words, the length of the reference portion 312a is longer by 0.75 mm than the length of the reference portion 312b. As a result, the second imaging optical element can be appropriately positioned in the optical axis direction even in the configuration in which the flange thickness on the incident side is different from that on the anti-incident side.

In addition, as illustrated in FIG. 3A, a reference portion (Y reference portion) 309 for positioning the second imaging optical element in the main scanning direction is provided at an end portion on the opposite side to the gate portion 308 of the second imaging optical element in the main scanning direction. In addition, reference portions (Z reference portions) 307a and 307b for positioning the second imaging optical element in the sub scanning direction are provided at upper end portions (end portions in the sub scanning direction) of the flange portions of the second imaging optical element.

In addition, the flange thicknesses of the second imaging optical element are different between the incident side and the anti-incident side. Thus, during the injection molding, distances in the optical axis direction from a surface vertex on the optical axis of the second imaging optical element to the respective reference surfaces of the reference portions 312a and 312b may be different from each other. For this reason, it is preferable to provide linear guide lines (markings) at the upper end portion and the lower end portion of the second imaging optical element. With this configuration, even when the positions of the respective reference surfaces of the reference portions 312a and 312b are asymmetric to each other with respect to the optical axis, the amount of warping in the optical axis direction of the second imaging optical element can be accurately measured. In addition, the present invention is not limited to this configuration, and may employ a configuration in which cross guide lines are provided at three points, i.e., a center portion and both end portions in the main scanning direction of the second imaging optical element.

As described above, by employing the second imaging optical element as described above, the optical scanning device 100 according to the present exemplary embodiment can be downsized in the main scanning direction while ensuring a sufficient light amount on the scanned surface. As a result, in an image forming apparatus including the optical scanning device 100, the entire apparatus can be downsized, and image formation can be performed with high accuracy and at high speed.

Second Exemplary Embodiment

FIG. 4A is a main-scanning cross-sectional view of an optical scanning device 200 according to the second exemplary embodiment of the present invention. FIG. 4B is a main-scanning cross-sectional view of an optical scanning device 400 according to a comparative example. The optical scanning device 200 according to the second exemplary embodiment and the optical scanning device 400 according to the comparative example are optical scanning devices of a type of optically scanning a single scanned surface 15 using a single deflector 6, unlike the optical scanning device 100 according to the first exemplary embodiment.

In the present exemplary embodiment, unlike the first exemplary embodiment, not only a second imaging optical element 21b but also a first imaging optical element 21a have shapes in which effective lengths and effective thicknesses are asymmetric with respect to the optical axis. In contrast, in the comparative example, both of a first imaging optical element 41a and a second imaging optical element 41b have shapes in which effective lengths and effective thicknesses are symmetric with respect to the optical axis.

Table 2 shows each numerical value related to the optical scanning device 200 according to the present exemplary embodiment. In addition, the shape of each optical surface according to the present exemplary embodiment is defined by a function similar to that in the first exemplary embodiment.

TABLE 2

| | |
|---|---|
| USED WAVELENGTH (mm) | 7.90E−07 |
| REFRACTIVE INDEX OF IMAGING OPTICAL ELEMENTS 11a AND 11b | 1.524 |
| NUMBER OF DEFLECTING SURFACES OF DEFLECTOR 6 | 4 |
| CIRCUMSCRIBED CIRCLE DIAMETER OF DEFLECTOR 6 (mm) | 20 |
| INCIDENT SIDE SCAN ANGLE OF DEFLECTOR 6 (deg.) | 21.2 |
| ANTI-INCIDENT SIDE SCAN ANGLE OF DEFLECTOR 6 (deg.) | 10.6 |
| INCIDENT ANGLE IN MAIN-SCANNING CROSS SECTION (deg.) | 75 |
| INCIDENT ANGLE IN SUB-SCANNING CROSS SECTION (deg.) | 0 |
| ON-AXIS DEFLECTION POINT - INCIDENT SURFACE OF FIRST IMAGING OPTICAL ELEMENT 11a (mm) | 2.74E+01 |
| MAIN-SCANNING FOCAL LENGTH OF IMAGING OPTICAL SYSTEM (mm) | 1.89E+02 |

| ROTATION CENTER COORDINATE OF DEFLECTOR | |
|---|---|
| X | −6.282 |
| Y | −3.428 |

| INCIDENT OPTICAL SYSTEM | | | |
|---|---|---|---|
| | r | d | N (790 nm) |
| LIGHT SOURCE (LIGHT EMITTING POINT) | 0.0000 | 27.9310 | 0.0000 |
| COLLIMATOR LENS | 0.0000 | 3.0000 | 1.7617 |
| | −22.9270 | 19.4626 | 0.0000 |

TABLE 2-continued

| | | | |
|---|---|---|---|
| CYLINDRICAL LENS*1 | 79.6607 | 3.0000 | 1.5240 |
| | 0.00 | 36.9900 | 1.0000 |
| MAIN-SCANNING DIAPHRAGM | | 37.0100 | |
| DEFLECTING SURFACE | 0.0000 | 0.0000 | −1.0000 |

*1 PHASE FUNCTION OF CYLINDRICAL LENS

PHASE COEFFICIENT

| | |
|---|---|
| F0 | −3.47E−03 |
| F1 | 0.00E+00 |
| F2 | 0.00E+00 |
| F3 | 0.00E+00 |
| F4 | 0.00E+00 |
| F5 | 0.00E+00 |
| F6 | 0.00E+00 |

IMAGING OPTICAL SYSTEM

| | | R1 SURFACE | | | R2 SURFACE | | |
|---|---|---|---|---|---|---|---|
| | | INCIDENT SIDE (s) | | ANTI-INCIDENT SIDE (e) | | INCIDENT SIDE (s) | ANTI-INCIDENT SIDE (e) |
| MAIN-SCANNING CROSS SECTION | d | 9.50E+00 | | | d | −1.870E+01 | |
| | R | −3.80E+01 | | | R | −2.62E+01 | |
| | K | −1.20E+00 | K | −1.20E+00 | K | −1.60E+00 | K | −1.60E+00 |
| | B4 | −3.80E−06 | B4 | −3.80E−06 | B4 | −5.56E−06 | B4 | −5.56E−06 |
| | B6 | 3.70E−09 | B6 | 3.70E−09 | B6 | −7.93E−10 | B6 | −7.93E−10 |
| | B8 | 0.00E+00 | B8 | 0.00E+00 | B8 | 3.40E−12 | B8 | 3.40E−12 |
| | B10 | 0.00E+00 | B10 | 0.00E+00 | B10 | 0.00E+00 | B10 | 0.00E+00 |
| SUB-SCANNING CROSS SECTION | r | −1.51E+01 | | | r | −1.66E+01 | |
| | D2 | 0.00E+00 | D2 | 0.00E+00 | D2 | −1.69E−05 | D2 | −4.99E−05 |
| | D4 | 0.00E+00 | D4 | 0.00E+00 | D4 | −8.06E−07 | D4 | −5.87E−07 |
| | D6 | 0.00E+00 | D6 | 0.00E+00 | D6 | 1.63E−09 | D6 | 1.31E−09 |
| | D8 | 0.00E+00 | D8 | 0.00E+00 | D8 | −1.20E−12 | D8 | −1.04E−12 |
| | D10 | 0.00E+00 | D10 | 0.00E+00 | D10 | 9.59E−17 | D10 | 1.19E−16 |

| | | R3 SURFACE | | | R4 SURFACE | | |
|---|---|---|---|---|---|---|---|
| | | INCIDENT SIDE (s) | | ANTI-INCIDENT SIDE (e) | | INCIDENT SIDE (s) | ANTI-INCIDENT SIDE (e) |
| MAIN-SCANNING CROSS SECTION | d | 7.20E+00 | | | d | 1.70E+02 | |
| | R | 9.99E+02 | | | R | 1.52E+02 | |
| | K | −1.24E+04 | K | −1.24E+04 | K | −1.04E+02 | K | −1.04E+02 |
| | B4 | −1.66E−06 | B4 | −1.66E−06 | B4 | −2.66E−06 | B4 | −2.66E−06 |
| | B6 | 6.86E−10 | B6 | 6.86E−10 | B6 | 9.09E−10 | B6 | 9.09E−10 |
| | B8 | −1.40E−13 | B8 | −1.40E−13 | B8 | −2.65E−13 | B8 | −2.65E−13 |
| | B10 | 8.90E−18 | B10 | 8.90E−18 | B10 | 5.20E−17 | B10 | 5.20E−17 |
| | B12 | 0.00E+00 | B12 | 0.00E+00 | B12 | −5.70E−21 | B12 | −5.70E−21 |
| SUB-SCANNING CROSS SECTION | r | 5.00E+02 | | | r | −3.03E+01 | |
| | D2 | 1.15E−03 | D2 | 1.15E−03 | D2 | 1.34E−04 | D2 | 1.34E−04 |
| | D4 | 1.24E−06 | D4 | 1.24E−06 | D4 | −2.03E−07 | D4 | −2.03E−07 |
| | D6 | 4.70E−09 | D6 | 4.70E−09 | D6 | 1.43E−10 | D6 | 1.43E−10 |
| | D8 | −4.27E−12 | D8 | −4.27E−12 | D8 | −4.65E−14 | D8 | −4.65E−14 |
| | D10 | 9.21E−16 | D10 | 9.21E−16 | D10 | 5.78E−18 | D10 | 5.78E−18 |
| ADDITIONAL TERM | m01 | 0.00E+00 | | | m01 | 0.00E+00 | |
| | m11 | 0.00E+00 | | | m11 | 0.00E+00 | |
| | m21 | 0.00E+00 | | | m21 | 0.00E+00 | |
| | m31 | 0.00E+00 | | | m31 | 0.00E+00 | |
| | m41 | 0.00E+00 | | | m41 | 0.00E+00 | |
| | m51 | 0.00E+00 | | | m51 | 0.00E+00 | |
| | m61 | 0.00E+00 | | | m61 | 0.00E+00 | |
| | m71 | 0.00E+00 | | | m71 | 0.00E+00 | |
| | m81 | 0.00E+00 | | | m81 | 0.00E+00 | |
| | m91 | 0.00E+00 | | | m91 | 0.00E+00 | |
| | m101 | 0.00E+00 | | | m101 | 0.00E+00 | |
| | m111 | 0.00E+00 | | | m111 | 0.00E+00 | |
| | m121 | 0.00E+00 | | | m121 | 0.00E+00 | |
| | m131 | 0.00E+00 | | | m131 | 0.00E+00 | |
| | m141 | 0.00E+00 | | | m141 | 0.00E+00 | |
| | m151 | 0.00E+00 | | | m151 | 0.00E+00 | |
| | m161 | 0.00E+00 | | | m161 | 0.00E+00 | |

Figure 5A:
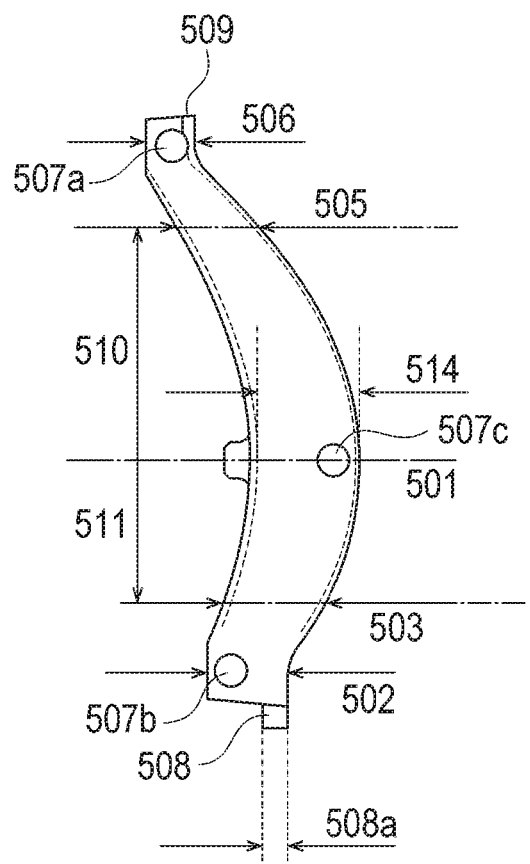
FIGS. 5A and 5B are main part schematic views of a first imaging optical element according to the second exemplary embodiment of the present invention.
Figure 5B:
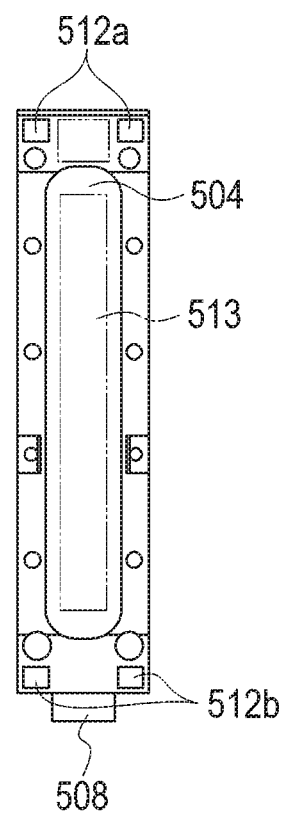

FIGS. 5A and 5B are main part schematic views of the first imaging optical element 21a according to the present exemplary embodiment. FIG. 5A is a top view and FIG. 5B is a side view (incident surface side). Similarly to the second imaging optical element according to the first exemplary embodiment, the first imaging optical element according to the present exemplary embodiment has such a shape that, in the main scanning direction, a length of an effective portion 513 and a thickness of an effective end portion are asymmetric with respect to the optical axis. Specifically, as illustrated in FIG. 5A, in the effective portion 513 of the first imaging optical element, an effective length 510 on the incident side is longer than an effective length 511 on the anti-incident side, and an effective thickness 505 on the incident side is thinner than an effective thickness 503 on the anti-incident side.

In the first imaging optical element, a half value A of a scanning field angle on the incident side is A=20.1°, a half value B of a scanning field angle on the anti-incident side is B=10.6°, an effective thickness $D_A$ on the incident side is $D_A$=6.8 mm, and an effective thickness $D_B$ on the anti-incident side is $D_B$=8.7 mm, so that these value satisfy Conditional Expression (1). In addition, a flange thickness $d_A$ on the incident side is $d_A$=4.7 mm, and a flange thickness $d_B$ on the anti-incident side is $d_B$=7.9 mm, so that these values satisfy Conditional Expression (2). Furthermore, a gate thickness Dc is Dc=2.5 mm, an effective thickness Dd on the anti-gate side is Dd=$D_A$=6.8 mm, and an effective thickness De on the gate side is De=$D_B$=8.7 mm, so that these values satisfy Conditional Expression (3).

In addition, in the first imaging optical element according to the present exemplary embodiment, flange portions are provided with two X reference portions 512a and two X reference portions 512b on the incident surface side. In addition, the reference portions 512a are shifted by 5.7 mm toward the deflector 6 side with respect to the reference portions 512b at the flange portion on the anti-incident side.

In addition, upper end portions of the first imaging optical element are provided with Z reference portions 507a, 507b, and 507c at both flange portions and on the optical axis.

Figure 6A:
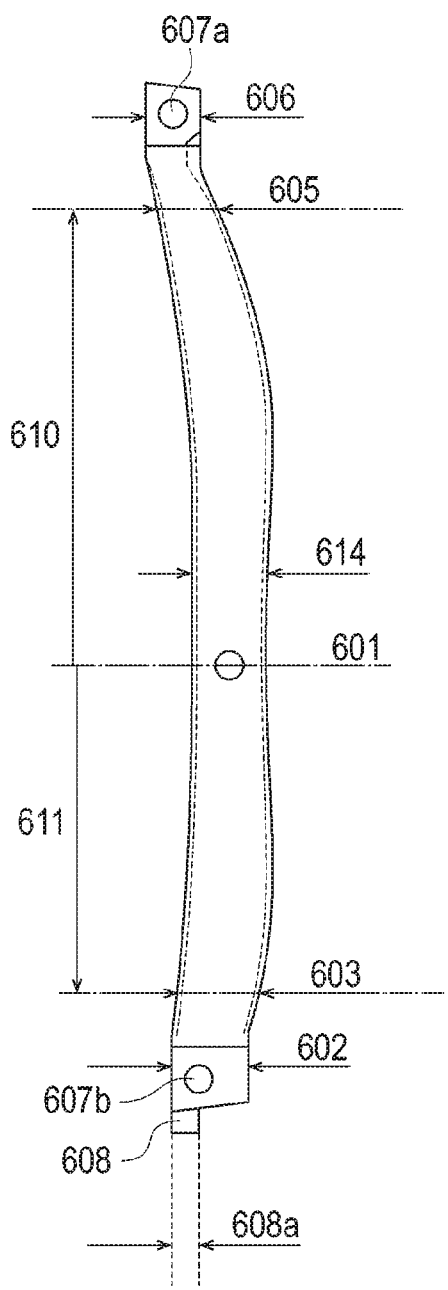
FIGS. 6A and 6B are main part schematic views of a second imaging optical element according to the second exemplary embodiment of the present invention.
Figure 6B:
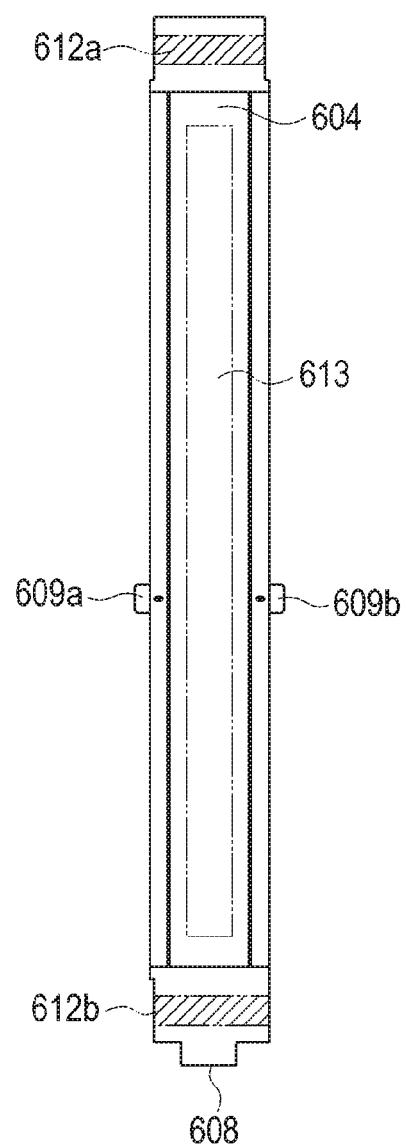

FIGS. 6A and 6B are main part schematic views of the second imaging optical element 21b according to the present exemplary embodiment. FIG. 6A is a top view and FIG. 6B is a side view (incident surface side). Similarly to the second imaging optical element according to the first exemplary embodiment, the second imaging optical element according to the present exemplary embodiment has such a shape that, in the main scanning direction, a length of an effective portion 613 and a thickness of an effective end portion are asymmetric with respect to the optical axis. Specifically, as illustrated in FIG. 6A, in the effective portion 613 of the second imaging optical element, an effective length 610 on the incident side is longer than an effective length 611 on the anti-incident side, and an effective thickness 605 on the incident side is thinner than an effective thickness 603 on the anti-incident side.

In the second imaging optical element, a half value A of a scanning field angle on the incident side is A=20.1°, a half value B of a scanning field angle on the anti-incident side is B=10.6°, an effective thickness $D_A$ on the incident side is $D_A$=6.6 mm, and an effective thickness $D_B$ on the anti-incident side is $D_B$=8.0 mm, so that these values satisfy Conditional Expression (1). In addition, a flange thickness $d_A$ on the incident side is $d_A$=5.8 mm, and a flange thickness $d_B$ on the anti-incident side is $d_B$=8.4 mm, so that these values satisfy Conditional Expression (2). Furthermore, a gate thickness Dc is Dc=3.0 mm, an effective thickness Dd on the anti-gate side is Dd=$D_A$=6.6 mm, and an effective thickness De on the gate side is De=$D_B$=8.0 mm, so that these values satisfy Conditional Expression (3).

In addition, in the second imaging optical element according to the present exemplary embodiment, a reference portion 612a at the flange portion on the incident side is shifted by 3.0 mm toward the deflector 6 side with respect to a reference portion 612b at the flange portion on the anti-incident side. In addition, in the present exemplary embodiment, as illustrated in FIG. 6B, on the optical axis, an upper end portion and a lower end portion in the sub scanning direction of the second imaging optical element are provided with reference portions (Y reference portions) 609a and 609b for positioning the second imaging optical element in the main scanning direction. With this configuration, the second imaging optical element can be expanded substantially-uniformly in the main scanning direction even when environmental temperature rises.

As described above, by employing the first and second imaging optical elements illustrated in FIGS. 5A and 5B and FIGS. 6A and 6B, the optical scanning device 200 according to the present exemplary embodiment can be configured so that scanning field angles and scanning widths become different between the incident side and the anti-incident side. With this configuration, an imaging optical system can be arranged with being shifted toward the anti-incident side, as compared with a configuration in which a scanning field angle is symmetric with respect to the optical axis. Specifically, the imaging optical system according to the present exemplary embodiment is arranged so that an optical axis thereof is at a position shifted by 35 mm toward the anti-incident side with respect to a perpendicular bisector of the scanned surface 15.

In the optical scanning device 200 according to the present exemplary embodiment, by employing such a configuration, as illustrated in FIGS. 4A and 4B, a light source, an incident optical system, and the deflector 6 can be arranged with each being shifted toward the anti-incident side, as compared with those in the optical scanning device 400 according to the comparative example. With this configuration, the optical scanning device 200 can be downsized in the main scanning direction while ensuring a sufficient light amount on the scanned surface.

Third Exemplary Embodiment

Figure 7:
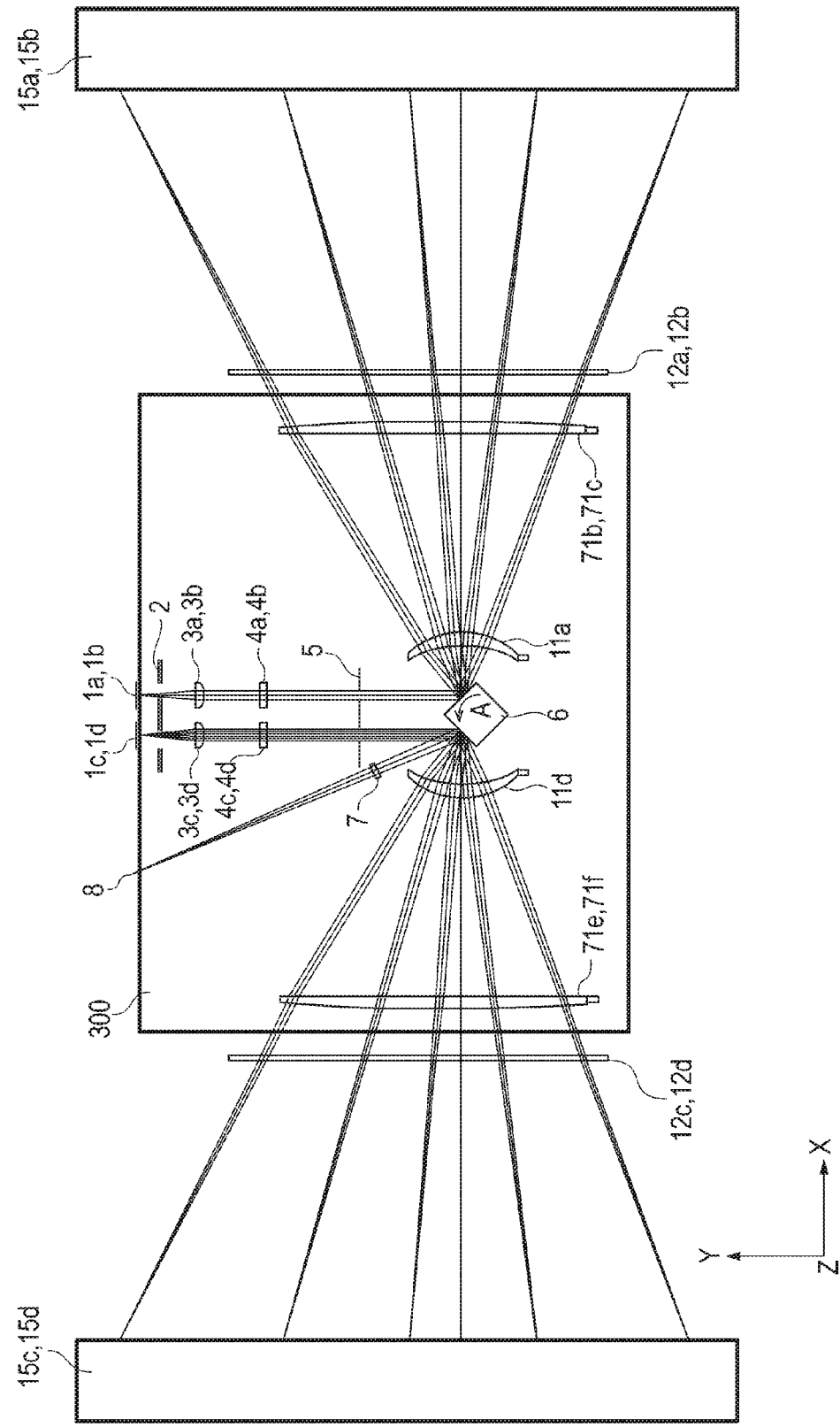
FIG. 7 is a main-scanning cross-sectional view of an optical scanning device according to a third exemplary embodiment of the present invention.

FIG. 7 is a main-scanning cross-sectional view of an optical scanning device 300 according to the third exemplary embodiment of the present invention. Unlike the optical scanning device 100 according to the first exemplary embodiment, the optical scanning device 300 according to the present exemplary embodiment has a second imaging optical element in which a gate thickness Dc, an effective thickness Dd on the anti-gate side, and an effective thickness De on the gate side each satisfy the following Conditional Expression (4):

$$Dd<Dc<De \qquad (4).$$

Table 3 shows each numerical value related to the optical scanning device 300 according to the present exemplary embodiment. In addition, the shape of each optical surface according to the present exemplary embodiment is defined by a function similar to that in the first exemplary embodiment.

TABLE 3

| | |
|---|---|
| USED WAVELENGTH (mm) | 7.90E−07 |
| REFRACTIVE INDEX OF IMAGING OPTICAL ELEMENTS 11a TO 11f | 1.529 |
| NUMBER OF DEFLECTING SURFACES OF DEFLECTOR 6 | 4 |
| CIRCUMSCRIBED CIRCLE DIAMETER OF DEFLECTOR 6 (mm) | 20 |
| INCIDENT SIDE SCAN ANGLE OF DEFLECTOR 6 (deg.) | 19.1 |
| ANTI-INCIDENT SIDE SCAN ANGLE OF DEFLECTOR 6 (deg.) | 10.9 |
| INCIDENT ANGLE IN MAIN-SCANNING CROSS SECTION (deg.) | 90 |
| INCIDENT ANGLE IN SUB-SCANNING CROSS SECTION (deg.) | 2.7 |
| ON-AXIS DEFLECTION POINT - INCIDENT SURFACES OF FIRST IMAGING OPTICAL ELEMENTS 11a AND 11d (mm) | 2.00E+01 |
| MAIN-SCANNING FOCAL LENGTH OF IMAGING OPTICAL SYSTEM (mm) | 2.10E+02 |

ROTATION CENTER COORDINATE OF DEFLECTOR

| | |
|---|---|
| X | −5.500 |
| Y | −4.500 |

INCIDENT OPTICAL SYSTEM

| | r | d | N (790 nm) |
|---|---|---|---|
| LIGHT SOURCE (LIGHT EMITTING POINT) | 0.0000 | 9.9500 | 0.0000 |
| SUB-SCANNING DIAPHRAGM | | 13.3980 | |
| COLLIMATOR LENS | 0.0000 | 3.0000 | 1.7617 |
|  | −19.0457 | 22.2820 | 0.0000 |
| CYLINDRICAL LENS*1 | 58.6205 | 3.0000 | 1.5240 |
|  | 0.00 | 41.2010 | 1.0000 |
| MAIN-SCANNING DIAPHRAGM | | 40.0000 | |
| DEFLECTING SURFACE | 0.0000 | 0.0000 | −1.0000 |

*1 PHASE FUNCTION OF CYLINDRICAL LENS
PHASE COEFFICIENT

| | |
|---|---|
| F0 | −2.00E−03 |
| F1 | 0.00E+00 |
| F2 | 0.00E+00 |
| F3 | 0.00E+00 |
| F4 | 0.00E+00 |
| F5 | 0.00E+00 |
| F6 | 0.00E+00 |

IMAGING OPTICAL SYSTEM

| | | R1 SURFACE | | | R2 SURFACE | |
|---|---|---|---|---|---|---|
| | | INCIDENT SIDE (s) | ANTI-INCIDENT SIDE (e) | | INCIDENT SIDE (s) | ANTI-INCIDENT SIDE (e) |
| MAIN-SCANNING CROSS SECTION | d | 5.00E+00 | | d | 7.910E+01 | |
| | R | −3.81E+01 | | R | −2.90E+01 | |
| | K | −3.87E−01 K | −3.87E−01 | K | −1.59E+00 K | −1.59E+00 |
| | B4 | 6.58E−06 B4 | 6.58E−06 | B4 | −1.74E−06 B4 | −1.74E−06 |
| | B6 | −6.02E−09 B6 | −6.02E−09 | B6 | −9.44E−12 B6 | −9.44E−12 |
| | B8 | −1.18E−11 B8 | −1.18E−11 | B8 | −5.76E−12 B8 | −5.76E−12 |
| | B10 | 0.00E+00 B10 | 0.00E+00 | B10 | −1.56E−14 B10 | −1.56E−14 |
| SUB-SCANNING CROSS SECTION | r | 2.00E+01 | | r | 2.00E+01 | |
| | D2 | 0.00E+00 D2 | 0.00E+00 | D2 | −5.40E−04 D2 | −3.83E−04 |
| | D4 | 0.00E+00 D4 | 0.00E+00 | D4 | 1.55E−06 D4 | 6.76E−07 |
| | D6 | 0.00E+00 D6 | 0.00E+00 | D6 | −1.83E−09 D6 | 4.45E−10 |
| | D8 | 0.00E+00 D8 | 0.00E+00 | D8 | | |
| | D10 | 0.00E+00 D10 | 0.00E+00 | D10 | | |

| | | R3 SURFACE | | | R4 SURFACE | |
|---|---|---|---|---|---|---|
| | | INCIDENT SIDE (s) | ANTI-INCIDENT SIDE (e) | | INCIDENT SIDE (s) | ANTI-INCIDENT SIDE (e) |
| MAIN-SCANNING CROSS SECTION | d | 3.50E+00 | | d | 1.31E+02 | |
| | R | −3.07E+03 | | R | 9.99E+02 | |
| | K | 0.00E+00 K | 0.00E+00 | K | −9.85E+02 K | −9.85E+02 |
| | B4 | 0.00E+00 B4 | 0.00E+00 | B4 | −2.37E−07 B4 | −2.37E−07 |
| | B6 | 0.00E+00 B6 | 0.00E+00 | B6 | 2.26E−11 B6 | 2.26E−11 |
| | B8 | 0.00E+00 B8 | 0.00E+00 | B8 | −1.67E−15 B8 | −1.67E−15 |
| | B10 | 0.00E+00 B10 | 0.00E+00 | B10 | 5.65E−20 B10 | 5.65E−20 |
| SUB-SCANNING CROSS SECTION | r | 8.92E+01 | | r | −4.56E+01 | |
| | D2 | 0.00E+00 D2 | 0.00E+00 | D2 | 1.14E−04 D2 | 1.18E−04 |
| | D4 | 0.00E+00 D4 | 0.00E+00 | D4 | −1.13E−08 D4 | −1.00E−08 |
| | D6 | 0.00E+00 D6 | 0.00E+00 | D6 | 2.30E−12 D6 | 1.59E−12 |
| | D8 | 0.00E+00 D8 | 0.00E+00 | D8 | −3.36E−16 D8 | −4.19E−16 |
| | D10 | 0.00E+00 D10 | 0.00E+00 | D10 | 2.21E−20 D10 | 1.19E−19 |

TABLE 3-continued

| | | | | |
|---|---|---|---|---|
| ADDITIONAL TERM | m01 | 5.06E−02 | m01 | −2.34E−02 |
| | m11 | 3.38E−06 | m11 | −1.16E−06 |
| | m21 | −2.91E−06 | m21 | 2.80E−06 |
| | m31 | 4.52E−09 | m31 | 1.70E−09 |
| | m41 | 5.73E−10 | m41 | −1.95E−10 |
| | m51 | −7.25E−12 | m51 | −3.16E−12 |
| | m61 | −1.55E−13 | m61 | −2.37E−14 |
| | m71 | 3.16E−15 | m71 | 7.81E−16 |
| | m81 | 8.67E−18 | m81 | 5.11E−18 |
| | m91 | −8.24E−19 | m91 | −1.19E−19 |
| | m101 | 9.24E−22 | m101 | −2.90E−21 |
| | m111 | 1.43E−23 | m111 | −6.28E−23 |
| | m121 | 2.46E−25 | m121 | 5.39E−25 |
| | m131 | 0.00E+00 | m131 | 5.39E−27 |
| | m141 | 0.00E+00 | m141 | 0.00E+00 |
| | m151 | 0.00E+00 | m151 | 0.00E+00 |
| | m161 | 0.00E+00 | m161 | 0.00E+00 |

In the second imaging optical element, a half value A of a scanning field angle on the incident side is A=20.1°, a half value B of a scanning field angle on the anti-incident side is B=10.6°, an effective thickness $D_A$ on the incident side is $D_A$=1.97 mm, and an effective thickness $D_B$ on the anti-incident side is $D_B$=3.83 mm, so that these values satisfy Conditional Expression (1). In addition, a flange thickness $d_A$ on the incident side is $d_A$=2.85 mm, and a flange thickness $d_B$ on the anti-incident side is $d_B$=5.15 mm, so that these values satisfy Conditional Expression (2). In addition, in the second imaging optical element according to the present exemplary embodiment, a reference portion (X reference portion) at a flange portion on the incident side is arranged with being shifted by 0.3 mm toward the deflector 6 side with respect to a reference portion (X reference portion) at a flange portion on the anti-incident side.

Furthermore, a gate thickness Dc is Dc=2.5 mm, an effective thickness Dd on the anti-gate side is Dd=$D_A$=1.97 mm, and an effective thickness De on the gate side is De=$D_B$=3.83 mm, so that these values satisfy Conditional Expression (4). Since these values satisfy Conditional Expression (4), an effective thickness on the anti-gate side can be made thinner as compared with that in the first exemplary embodiment, and the occurrence of a weld line or the like can be suppressed while shortening a mold time taken for forming the second imaging optical element through injection molding. Furthermore, a gate portion can be provided near the thickest portion in an effective portion, so that a mold time can be further shortened as compared with an imaging optical element symmetric in the main scanning direction.

Similarly to the first exemplary embodiment, the present exemplary embodiment also employs such a configuration that scanning field angles and scanning widths are different between the incident side and the anti-incident side. With this configuration, each imaging optical system is arranged with being shifted toward the anti-incident side, as compared with a configuration in which a scanning field angle is symmetric with respect to the optical axis. Specifically, the imaging optical system according to the present exemplary embodiment is arranged so that an optical axis thereof is at a position shifted by 30 mm toward the anti-incident side with respect to a perpendicular bisector of the scanned surface.

In the optical scanning device 300 according to the present exemplary embodiment, by employing such a configuration, a light source, an incident optical system, and a deflector can be arranged with each being shifted toward the anti-incident side, as compared with a configuration in which a scanning field angle is symmetric with respect to the optical axis, without changing the configuration of the incident optical system. With this configuration, the optical scanning device 300 can be downsized in the main scanning direction while ensuring a sufficient light amount on the scanned surface.

Fourth Exemplary Embodiment

Figure 8:
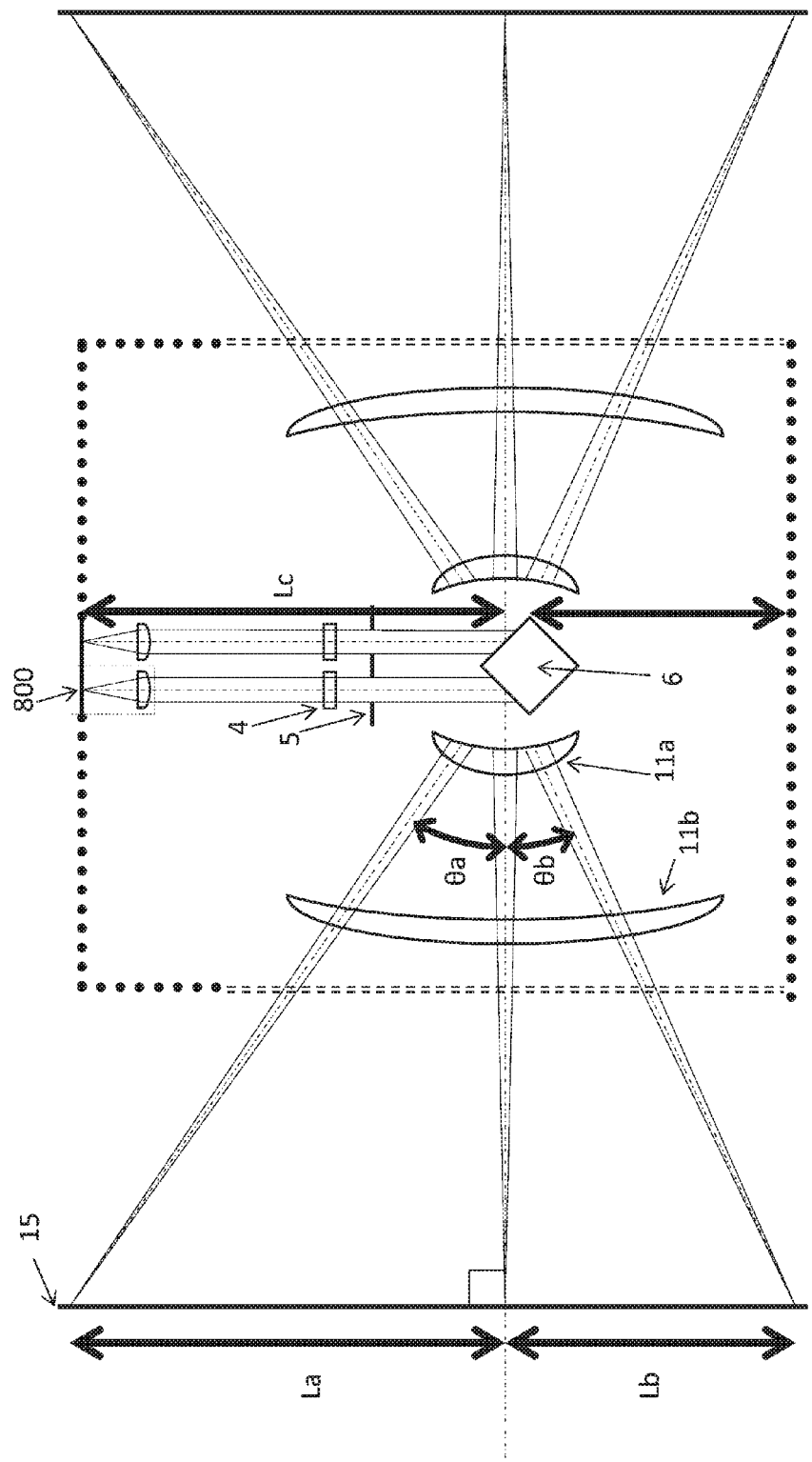
FIG. 8 is a main-scanning cross-sectional view of an optical scanning device according to a fourth exemplary embodiment of the present invention.
Figure 9:
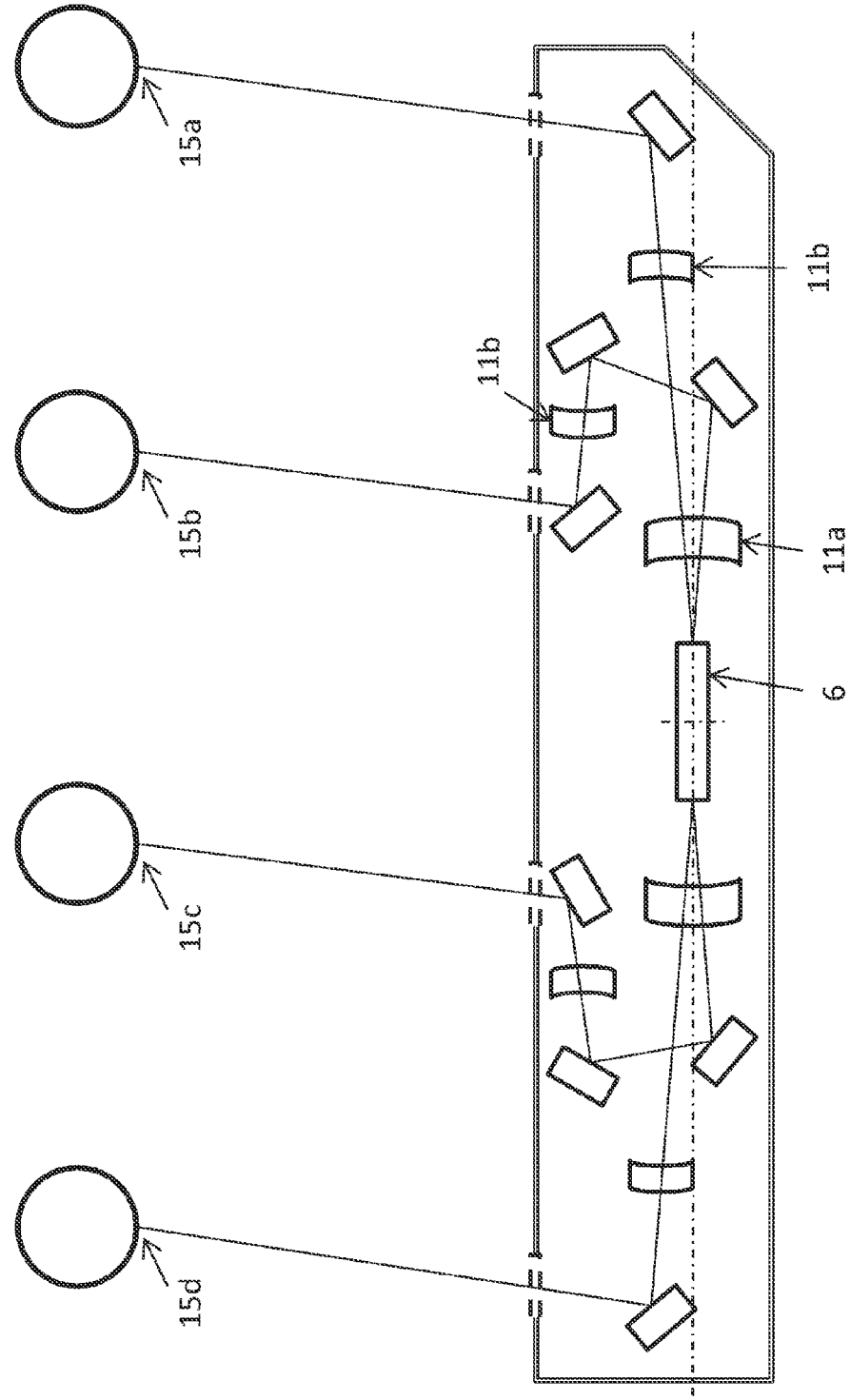
FIG. 9 is a sub-scanning cross-sectional view of the optical scanning device according to the fourth exemplary embodiment of the present invention.
Figure 10:
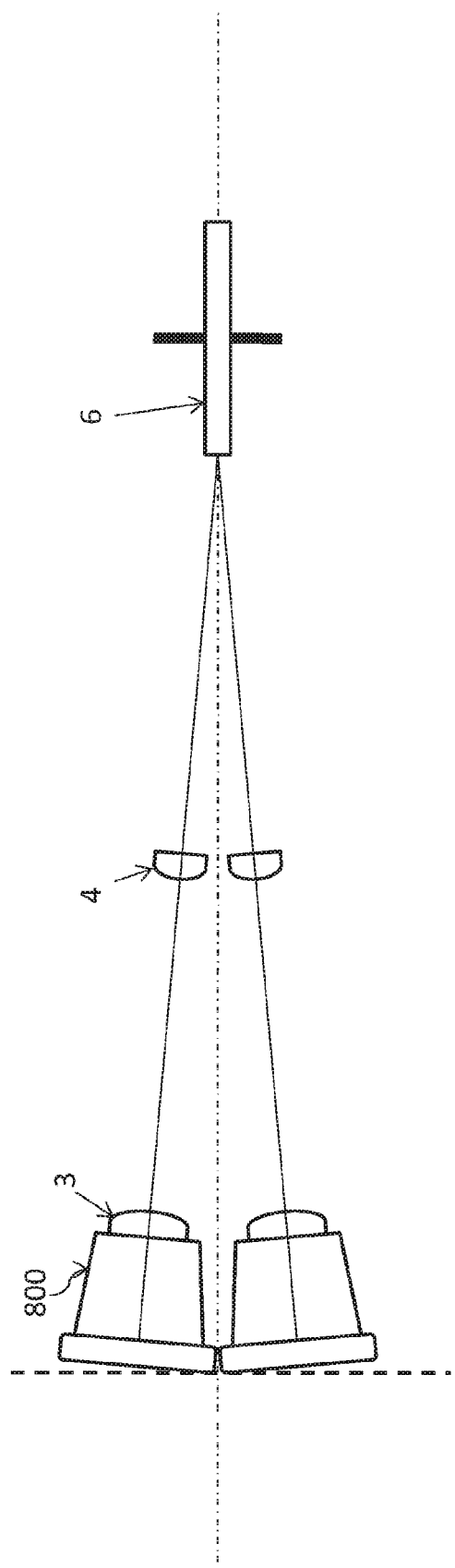
FIG. 10 is a main part schematic view of an incident optical system according to the fourth exemplary embodiment of the present invention.

FIGS. 8 to 10 are schematic views for describing in detail the downsizing of an optical scanning device according to the present invention in the main scanning direction. FIGS. 8 and 9 respectively illustrate a main-scanning cross-sectional view and a sub-scanning cross-sectional view of the optical scanning device, and FIG. 10 illustrates an enlarged view of components from a light source unit 800 including a light source and a collimator lens to the deflector 6.

As illustrated in FIG. 1, the optical scanning device according to the present exemplary embodiment satisfies the following Conditional Expression (5):

$$\theta a > \theta b \quad (5),$$

where a scanning field angle on an effective end portion side on the incident side is represented by θa, and a scanning field angle on an effective end portion side on the anti-incident side is represented by θb.

In addition, the optical scanning device according to the present exemplary embodiment satisfies the following Conditional Expression (6):

$$La < Lc \leq Lb \quad (6),$$

where a distance from one end portion of a scanned region to an optical axis is represented by La, a distance from the other end portion of the scanned region to the optical axis is represented by Lb, and a distance from a light emission surface of the light source to a deflecting surface is represented by Lc.

Figure 11:
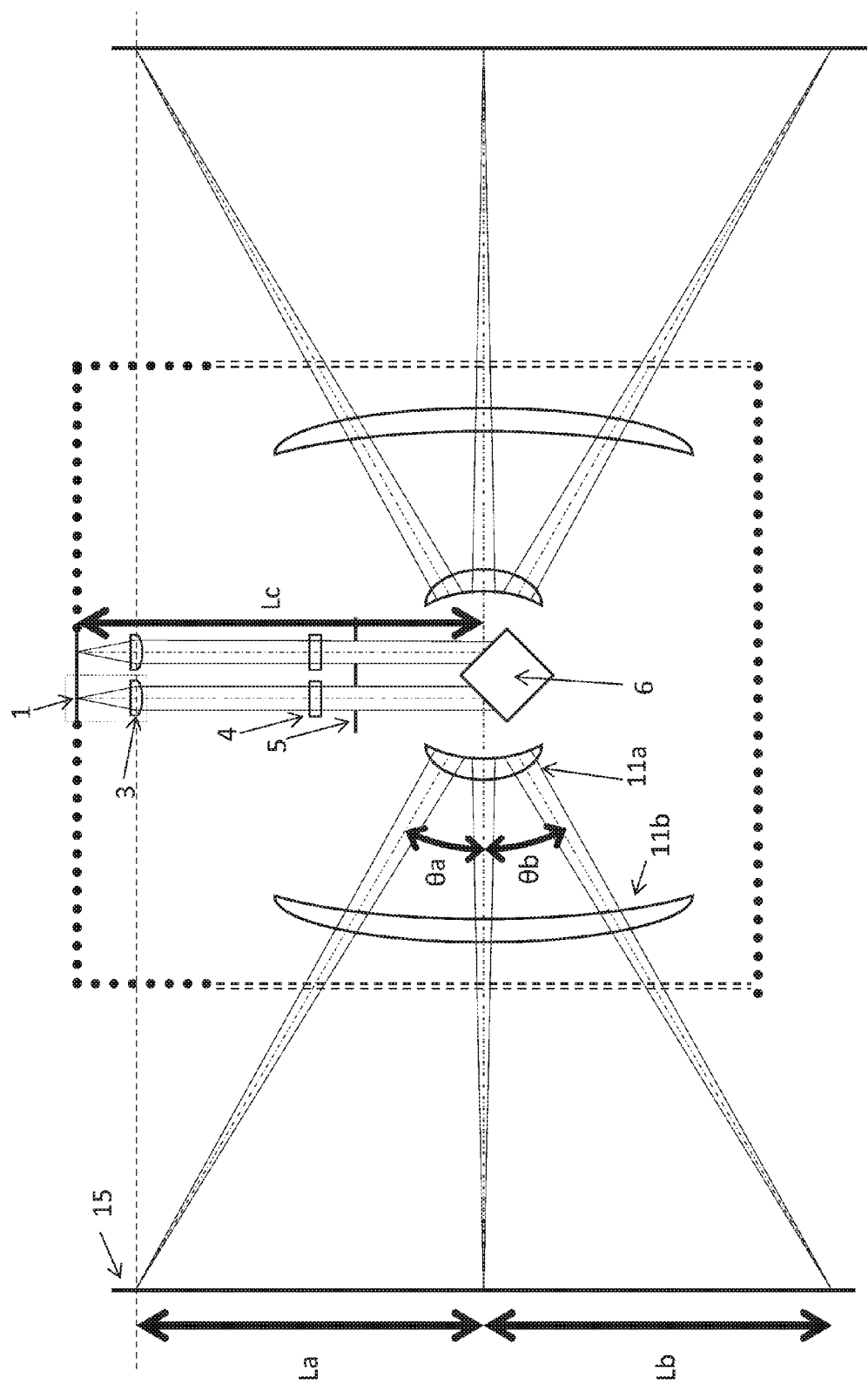
FIG. 11 is a main-scanning cross-sectional view of an optical scanning device according to a comparative example of the present invention.

In this manner, according to the optical scanning device according to the present invention, the light source can be arranged closer to the optical axis, and the distance Lc can be shortened, as compared with a configuration in which θa=θb and La=Lb as illustrated in FIG. 11.

In the configuration of optically scanning a plurality of scanned surfaces simultaneously using a single deflector by causing light beams from light sources to obliquely enter the deflecting surface of the deflector 6 as illustrated in FIG. 10, when the light sources are arranged close to each other, the present invention exhibits an especially-prominent effect. For example, by arranging light sources close to each other and mounting them on the same substrate, collimator lenses can be integrally formed, so that the device can be simplified and the cost saving can be achieved.

Nevertheless, when such a configuration is employed, an optical axis direction of an incident optical system and an optical axis direction of an imaging optical system become substantially-vertical to each other, and arrangement flexibility of each components accordingly decreases, so that the distance Lc is increased as compared with a case in which light sources are arranged not so close to each other. Thus, when the optical scanning device is configured to satisfy the above Conditional Expressions (5) and (6), this problem can be solved.

In addition, to suppress decline in optical performance that is attributed to a locational error (assembling error) of each component, it is desirable to decrease a longitudinal magnification of the incident optical system in the main-scanning cross section to decrease optical performance sensitivity to the locational error. At this time, it is necessary to increase a focal length of a collimator lens. Also in this case, when the optical scanning device is configured to satisfy the above Conditional Expressions (5) and (6), the upsizing of the entire device in the main scanning direction can be suppressed.

In addition, when an incident optical system as illustrated in FIG. 10 is employed, to suppress the bending of a scanning line on a scanned surface and decline in image forming performance, it is desirable to decrease an oblique incident angle with respect to a deflecting surface. At this time, it is necessary to secure a certain level of a distance from a light source to a deflector for preventing interference between components adjacent in the sub scanning direction. Also in this case, when the optical scanning device is configured to satisfy the above Conditional Expressions (5) and (6), the upsizing of the entire device in the main scanning direction can be suppressed.

When an image forming spot diameter on a scanned surface is reduced to achieve higher image quality, a light beam width in the main scanning direction on a light emitting surface of a collimator lens increase. It is therefore necessary to increase the external form of the collimator lens. In addition, for increasing the size of a developing device (toner container) in an image forming apparatus, it is necessary to increase an optical path length of an imaging optical system. Also in this case, it is necessary to increase the external diameter of the collimator lens for keeping a small image forming spot diameter on the scanned surface. Also in this case, when the optical scanning device is configured to satisfy the above Conditional Expressions (5) and (6), the upsizing of the entire device in the main scanning direction can be suppressed.

For example, the consideration will be given to a case in which an optical scanning device handling an A3-width scanned surface is diverted to be applied to an image forming apparatus having an A4-width scanned surface, and a case in which optical scanning devices handling both A3- and A4-width scanned surfaces are designed in common. In these cases, the optical scanning device handling the A3-width scanned surface optically scans only the A4 width of the scanned surface. At this time, it is desirable that the optical scanning device is configured to optically scan a light source side with respect to the optical axis more widely, for downsizing the entire device in the main scanning direction. Thus, also in this case, when the optical scanning device is configured to satisfy the above Conditional Expressions (5) and (6), the present invention exhibits a prominent effect.

Fifth Exemplary Embodiment

Figure 12:
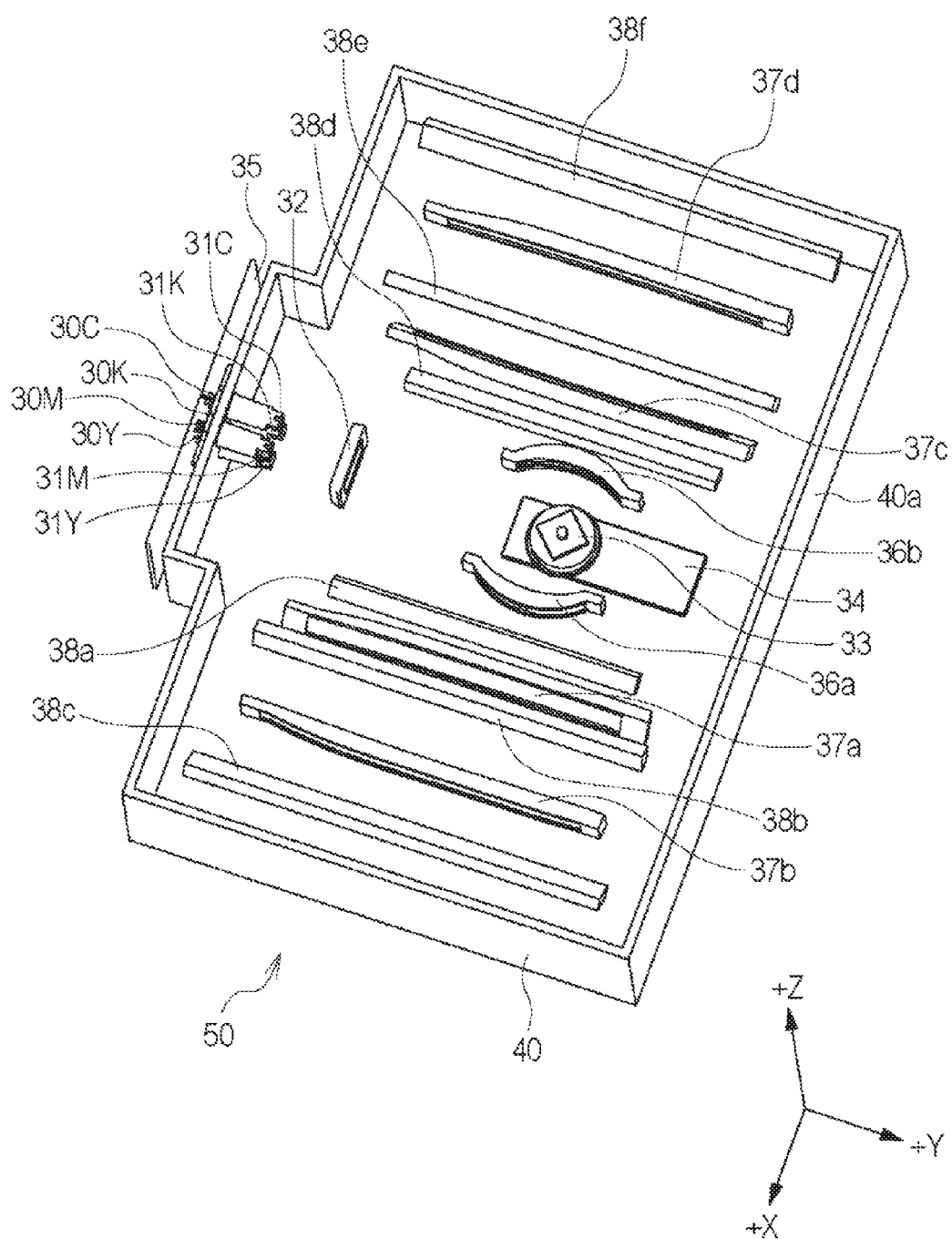
FIG. 12 is a schematic perspective view of an optical scanning device according to a fifth exemplary embodiment of the present invention.
Figure 13:
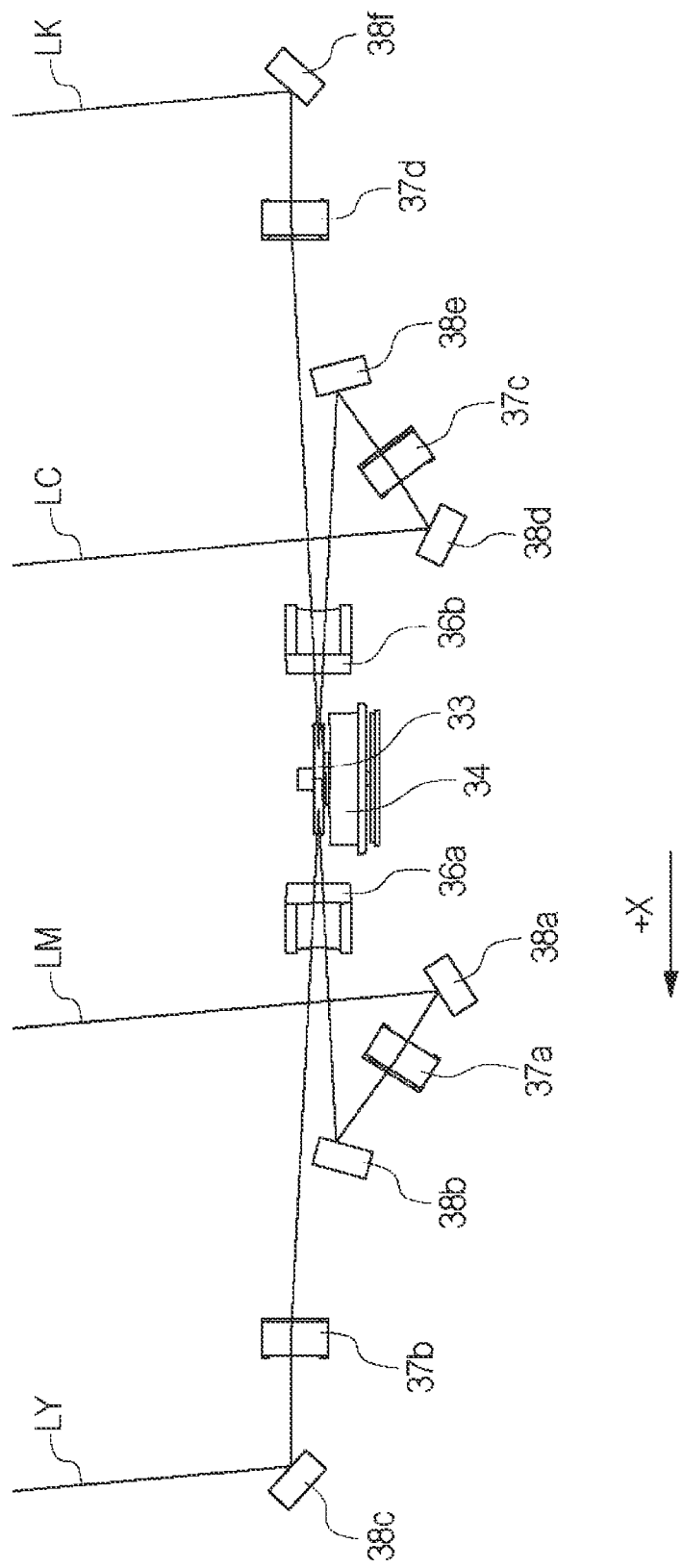
FIG. 13 is a sub-scanning cross-sectional view of a scanning optical system according to the fifth exemplary embodiment of the present invention.
Figure 14:
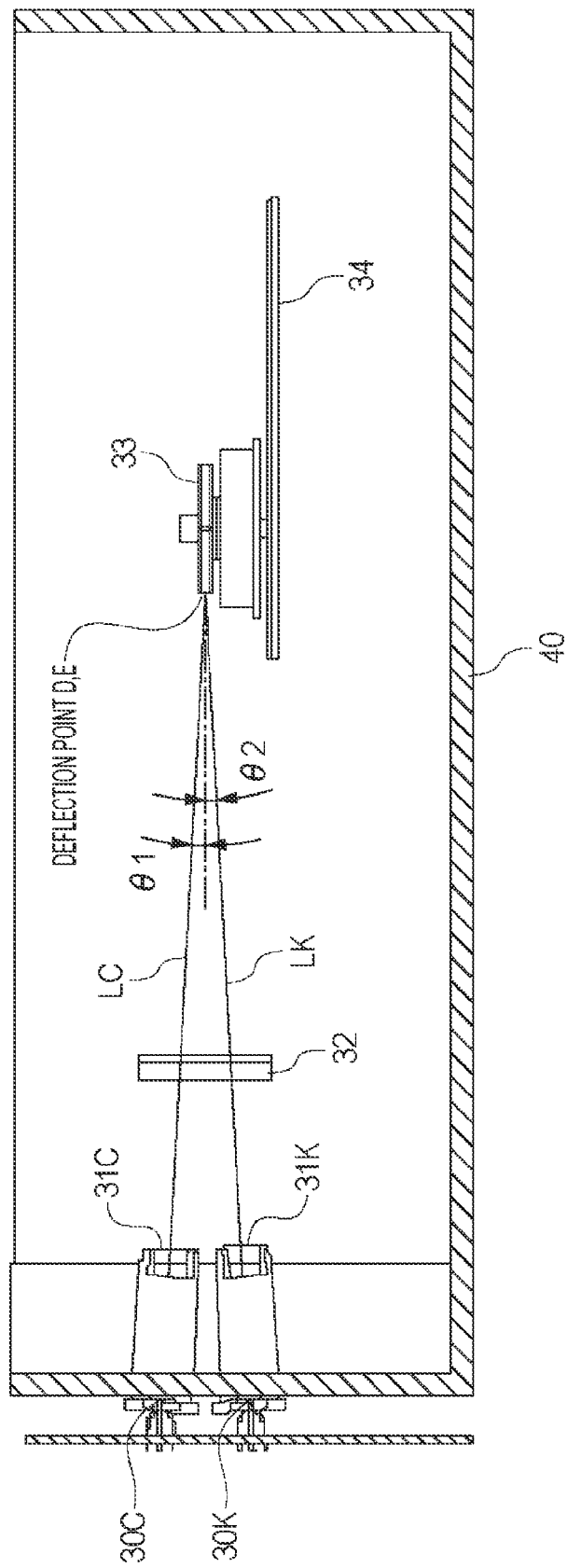
FIG. 14 is a sub-scanning cross-sectional view of an incident optical system according to the fifth exemplary embodiment of the present invention.

FIG. 12 is a perspective view illustrating an inner part of an optical scanning device 50 according to the present exemplary embodiment. FIG. 13 is a sub-scanning cross-sectional view of the optical scanning device 50. In addition, FIG. 14 is a sub-scanning cross-sectional view of an incident optical system. The optical scanning device 50 includes a box-shaped supporting member 40 having a side wall 40a on the outer side, and various optical members of the incident optical system and a scanning optical system, and a laser driving substrate 35.

Various optical members of the incident optical system and the scanning optical system (e.g., semiconductor lasers 30, collimator lenses 31, a cylindrical lens 32, a rotating polygon mirror 33, first scanning lenses 36, second scanning lenses 37, and scanning mirrors 38) are supported on the supporting member 40, and the positions thereof are fixed. The supporting member 40 has a box shape, and is attached to an image forming apparatus in a state in which the above-described various optical members are contained thereinside and supported thereon, and in a state in which the inner part thereof is covered by a cover (not illustrated).

Figure 15:
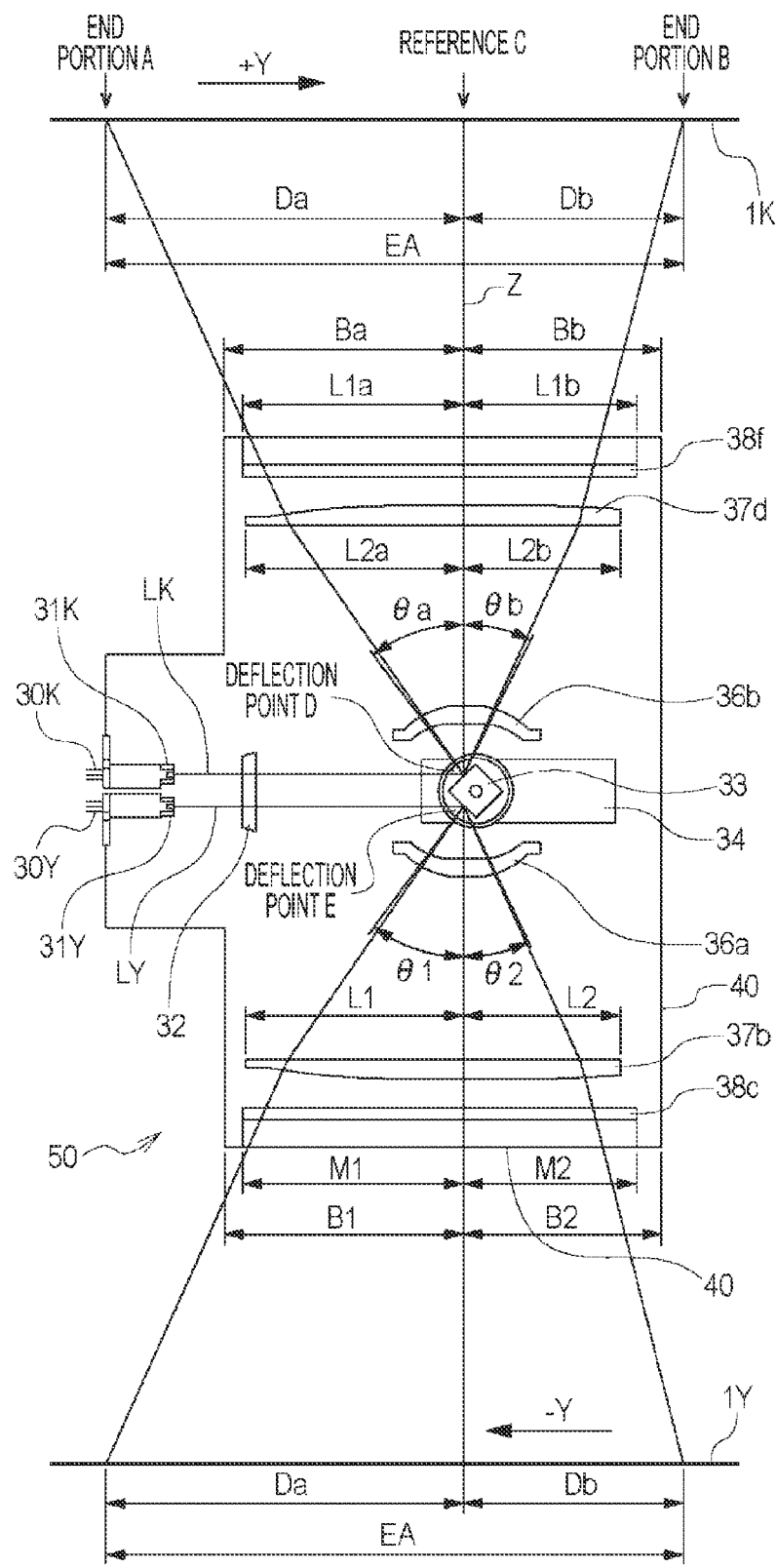
FIG. 15 is a main-scanning cross-sectional view of the optical scanning device according to the fifth exemplary embodiment of the present invention.

FIG. 15 is a view illustrating a main-scanning cross section of optical systems of laser beam LY and LK among laser beams LY, LM, LC, and LK in the optical scanning device 50. In addition, FIG. 15 also illustrates an optical system after reflection on scanning mirrors, on the same plane with being developed. In addition, since optical systems of the laser beams LM and LC is similar, the descriptions thereof will be omitted.

When viewed in the main-scanning cross section, the laser beams LY and LK respectively emitted from semiconductor lasers 30Y and 30K enter the same surface of the rotating polygon mirror 33 from the same direction. A principal ray of the laser beams LY and LK that is obtainable when the laser beams LY and LK reflected on the rotating polygon mirror 33 enter surfaces of corresponding photosensitive drums 1Y and 1K at an angle orthogonal in a scanning direction is set as a reference line Z (optical axis) of the laser beams LY and LK in the scanning optical system. In addition, FIG. 15 illustrates the surfaces of the photosensitive drums 1Y and 1K as line segments 1K and 1L. These line segments 1K and 1L are line segments parallel to a rotational axis of the photosensitive drums 1Y and 1K and the scanning direction.

At this time, a region of each photosensitive drum 1 where a latent image can be formed in the scanning direction is set as an effective scanned region (predetermined region) EA, and both end portions thereof are set as end portions A and B. The length in the scanning direction of a region of the effective scanned region EA that is on the side where the light sources 30 are arranged, with respect to the reference line Z in the scanning direction (region from the end portion A to a reference C) is represented by Da (125 mm), and a field angle required for scanning the region is represented by θa. In other words, a field angle formed between a principal ray of laser beams headed for the end portion A and the reference line Z is represented by θa. In addition, the length in the scanning direction of a region of the effective scanned region EA that is on the side where the light sources 30 are not arranged, with respect to the reference line Z in the scanning direction (region from the reference C to the end portion B) is represented by Db (85 mm), and a field angle required for scanning the region is represented by θb. In other words, a field angle formed between a principal ray of laser beams headed for the end portion B and the reference line Z is represented by θb. In addition, values of the above-described Da, Db, θa, and θb are set to satisfy the following Conditional Expression (7):

$$Da > Db, \theta a > \theta b \quad (7).$$

In addition, the description will be given of the lengths in the scanning direction of scanning mirrors 38c and 38f, which are optical members arranged on the most downstream sides on the respective optical paths of the laser beams LY and LK that are respectively emitted from the semiconductor lasers 30Y and 30K and reflected on the rotating polygon mirror 33 to be respectively headed for the photosensitive drums 1Y and 1K. As described above, on the end portion B side from the reference line Z, there is no need to cause the laser beams LY and LK to respectively enter the photosensitive drums 1Y and 1K at a field angle larger than the field angle θb. Thus, the scanning mirrors 38c and 38f are only required to be mirror effective regions (regions where mirror performance required for scanning is secured) at the portions corresponding to the field angle θb on the end portion B side from the reference line Z. Therefore, on the end portion B side from the reference line Z, portions of the scanning mirrors 38c and 38f that correspond to a field angle larger than the field angle θb may not be provided. Thus, the scanning mirrors 38c and 38f have the following shapes while securing mirror effective regions corresponding to the field angle θa on the end portion A side from the reference line Z, and corresponding to the field angle θb on the end portion B side from the reference line Z. More specifically, the scanning mirrors 38c and 38f each have such a shape that values L1a and L1b satisfy the following Conditional Expression (8):

$$L1a > L1b \quad (8),$$

where, in the scanning direction, a length of a potion on the end portion A side from the reference line Z is represented by L1a, and a length of a potion on the end portion B side from the reference line Z is represented by L1b.

In addition, scanning mirrors 38a, 38b, 38d, and 38e are in similar arrangements and in similar shapes to those of the scanning mirrors 38c and 38f.

Furthermore, the description will be given of the lengths in the scanning direction of second scanning lenses 37b and 37d, which are optical members arranged at one-level upstream sides of the scanning mirror 38c and 38f on the respective optical paths of the above-described laser beams LY and LK. As described above, on the end portion B side from the reference line Z, there is no need to cause the laser beams LY and LK to enter the photosensitive drums 1Y and 1K at a field angle larger than the field angle θb. Thus, the second scanning lenses 37b and 37d are only required to be lens effective regions (regions where lens performance required for scanning is secured) at the portions corresponding to the field angle θb on the end portion B side from the reference line Z. Therefore, on the end portion B side from the reference line Z, portions of the second scanning lenses 37b and 37d that correspond to a field angle larger than the field angle 9b may not be provided. Thus, the second scanning lenses 37b and 37d have the following shapes while securing lens effective regions corresponding to the field angle θa on the end portion A side from the reference line Z, and corresponding to the field angle θb on the end portion B side from the reference line Z. More specifically, the second scanning lenses 37b and 37d each have such a shape that values L2a and L2b satisfy the following Conditional Expression (9):

$$L2a > L2b \quad (9),$$

where, in the scanning direction, a length of a potion on the end portion A side from the reference line Z is represented by L2a, and a length of a potion on the end portion B side from the reference line Z is represented by L2b.

In addition, second scanning lenses 37a and 37c are in similar arrangements and in similar shapes to those of the second scanning lenses 37b and 37d. In addition, the description will be given of the length in the scanning direction of a portion including at least the scanning mirror 38c and 38f, which are arranged at the most downstream sides on the respective optical paths of the above-described laser beams LY and LK, among components of the supporting member 40. The portion will be referred to as a "scanning optical system including portion". When the length in the scanning direction of a portion of the supporting member 40 that is on the end portion A side from the reference line Z is represented by Ba, and the length in the scanning direction of a portion of the supporting member 40 that is on the end portion B side from the reference line Z is represented by Bb, values of Ba and Bb are set to satisfy the following Conditional Expression (10):

$$Ba > Bb \quad (10).$$

Comparison with Comparative Example

Figure 16:
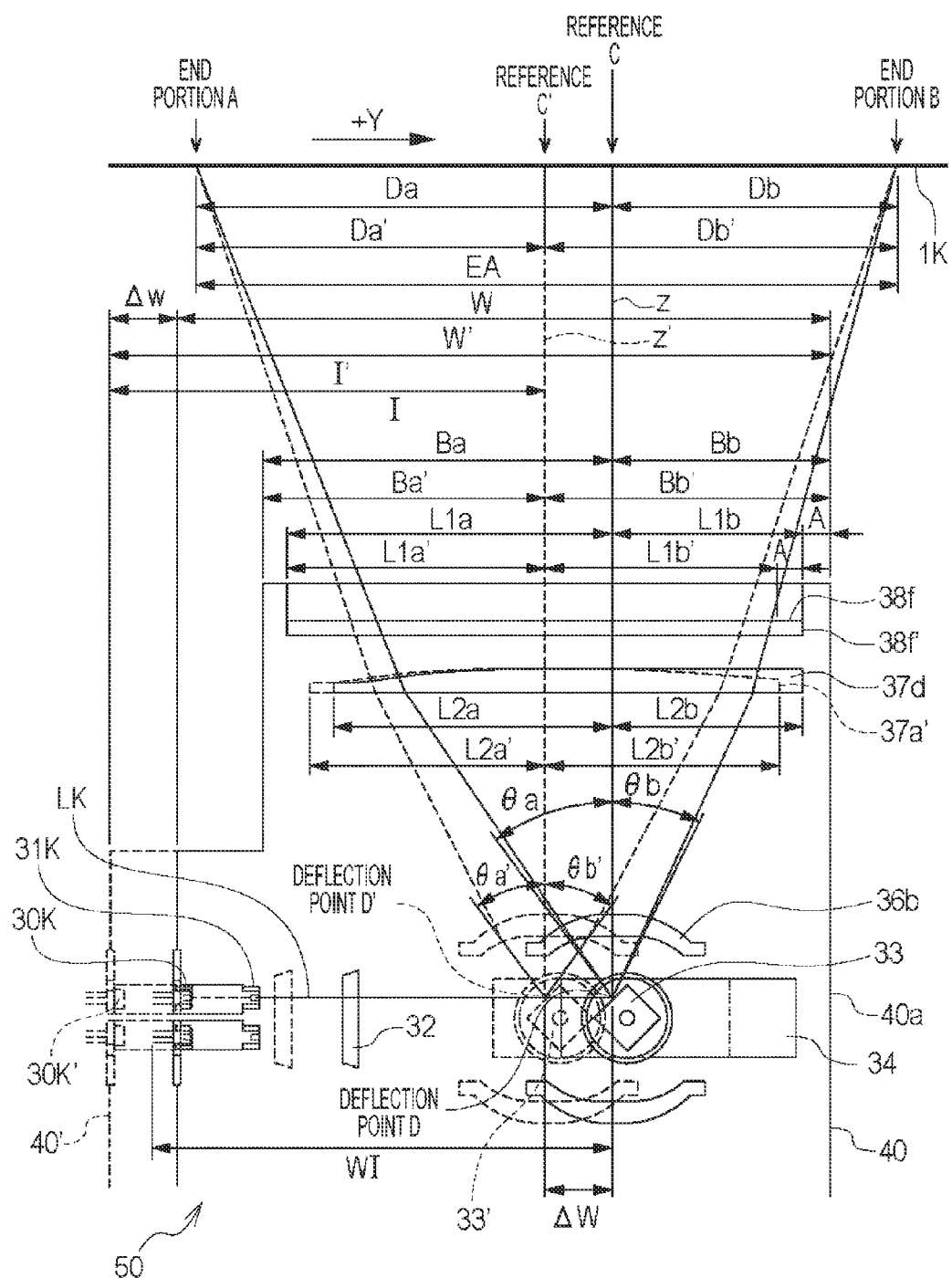
FIG. 16 is a main-scanning cross-sectional view of optical scanning devices according to the fifth exemplary embodiment and a comparative example of the present invention.

Next, the comparison between the present exemplary embodiment and the comparative example will be described with reference to FIG. 16. FIG. 16 is a view illustrating a main-scanning cross section of the optical system of the laser beam LK in the optical scanning device 50. An optical system α according to the present exemplary embodiment is illustrated using solid lines while an optical system β according to the comparative example is illustrated using broken lines. In addition, FIG. 16 only illustrates the optical system on the laser beam LK side, and the illustration of optical systems of the laser beams LY, LM, and LC are omitted since they are similar to that of the laser beam LK. In FIG. 16, the optical systems α and β are illustrated in an overlapped manner so that reference lines Z are overlapped with each other.

In the scanning direction, the length of an effective scanned region EA of the optical system α (length from the end portion A to the end portion B) and the length of an effective scanned region EA' of the optical system β (the length from an end portion A' to an end portion B') are the same, and are 210 mm.

The optical system α has relationships Da>Db and θa>θb as described above. In addition, the second scanning lens 37d has asymmetric optical performance with respect to the reference line Z as a line of symmetry since the lengths in the scanning direction starting from the reference line Z at the center are set to satisfy L2a>L2b according to the field angles θa and θb. The same applies to the scanning mirror 38f, and the lengths in the scanning direction starting from the reference line Z at the center are set to satisfy L1a>L1b.

In this manner, the scanning mirror 38f and the scanning lens 37d each have such a configuration that the length in the scanning direction of a portion on the side where a field angle is smaller (opposite side of the light sources) is set to be shorter than that of a portion on the side where a field angle is larger (light source side), in the scanning direction with respect to the reference line Z at the center. Thus, in the scanning optical system including portion of the supporting member 40, the length Bb in the scanning direction of a portion on the side where a field angle is smaller (opposite side of the light sources) in the scanning direction can be shortened. Meanwhile, in the scanning optical system including portion of the supporting member 40, the length Ba in the scanning direction of a portion on the side where a field angle is larger (light source side) in the scanning direction becomes longer, but a length I in the axis direction of the photosensitive drum 1K of the incident optical system is longer than the length Ba (Ba<I). In addition, the length I in the axis direction of the photosensitive drum 1K of the incident optical system corresponds to a length in the scanning direction from a light emitting point of the semiconductor laser 30K to the reference line Z. Thus, a length W in the axis direction of the photosensitive drum 1K (+Y direction) of the entire supporting member 40 can be represented as W=Bb+I.

In addition, a first scanning lens 36b has such symmetric optical performance that, with respect to the reference line Z as a line of symmetry, portions on both sides that correspond to the field angle θa can be scanned, even if the field angles required for scanning are set to satisfy the relationship θa>θb. This is because the first scanning lens 36b is arranged at a position relatively closer to the rotating polygon mirror 33 on the optical path, and accordingly, the length in the scanning direction of the first scanning lens 36b is relatively short. In other words, this is because, in the first scanning lens 36b, even if the length of a portion on the side where a field angle is smaller (opposite side of the light sources) is set to be shorter than that of a portion on the side where a field angle is larger (light source side), with respect to the reference line Z at the center, the length Bb in the scanning direction of the scanning optical system including portion cannot be shortened, and the length W in the scanning direction of the entire supporting member 40 is not affected. As a matter of course, in the portion of the first scanning lens 36b that is on the side where a field angle is smaller (opposite side of the light sources), a portion corresponding to the field angle θb is secured as a lens effective region, and a portion corresponding to a field angle larger than the field angle θb may not be provided. In other words, the length in the scanning direction of the portion on the side where the field angle is smaller (opposite side of the light sources) may be set to be shorter than that of the portion on the side where the field angle is larger (light source side).

The optical system β has the following arrangement. The length in the scanning direction of a region of the effective scanned region EA' that is on the side where a light source 30k' is arranged, with respect to the reference line Z in the scanning direction (region from an end portion A' to a reference C') is represented by Da' (105 mm), and a field angle required for scanning the region is represented by θa'. In addition, the length in the scanning direction of a region of the effective scanned region EA' that is on the side where the light source 30k' is not arranged, with respect to the reference line Z in the scanning direction (region from the reference C' to an end portion B') is represented by Db' (105 mm), and a field angle required for scanning the region is represented by θb'. In this manner, when the reference line Z is regarded as a line of symmetry, the lengths in the scanning direction of the effective scanned region EA' are the same. In other words, the optical system β satisfies relationships Da'=Db' and θa'=θb'.

Thus, a scanning mirror 38f' has such a shape that a length L1a' in the scanning direction of a portion on the light source side and a length L1b' in the scanning direction of a portion on the opposite side of the light sources, with respect to the reference line Z at the center have the same value (L1a'=L1b'). Similarly, a second scanning lens 37d' has such a shape that a length L2a' in the scanning direction of a portion on the light source side and a length L2b' in the scanning direction of a portion on the opposite side of the light sources, with respect to the reference line Z at the center have the same value (L2a'=L2b'). Thus, the scanning optical system including portion of the supporting member 40 has such a shape that a length Ba' in the scanning direction of a portion on the light source side and a length Bb' in the scanning direction of a portion on the opposite side of the light sources, with respect to the reference line Z at the center have the same value (Ba'=Bb'). In addition, a length I' in the scanning direction of the incident optical system is longer than the length Ba' in the scanning direction of the scanning optical system including portion that is on the light source side (Ba'<I'). Thus, a length W' in the axis direction of the photosensitive drum 1K (+Y direction) of the entire supporting member 40 can be represented as W'=Bb'+I'.

Comparison will now be made for the side where the light sources 30k and 30k' are not provided, with respect to the reference line Z in the scanning direction. The effective scanned region EA is positioned with being shifted in a −Y direction from the effective scanned region EA'. Thus, when viewed with the reference line Z as a reference, an end portion of the scanning mirror 38f is arranged with being shifted by a distance ΔL1 (=L1b'-L1b) in the −Y direction toward the reference line Z side with respect to an end portion of the scanning mirror 38f'. Similarly, the second scanning lens 37d is arranged with being shifted by a distance ΔL2 (=L2b'−L2b) in the −Y direction toward the reference line Z side with respect to the second scanning lens 37d'. Thus, the side wall 40a of the supporting member 40 can be arranged with being shifted by the distances ΔL1 and ΔL2 in the −Y direction toward the reference line Z side with respect to a side wall 40a' of a supporting member 40'. When the distance is represented by ΔW, the width W in the axis direction of the photosensitive drum 1K of the supporting member 40 can be represented by the following expression (11), using a width W' of the supporting member 40':

$$W=W'-\Delta W \quad (11).$$

In other words, the supporting member 40 of the optical system α can be more downsized in the scanning direction by the length ΔW.

In this manner, in the present exemplary embodiment, in the effective scanned region EA, the length Da in the scanning direction of the region on the side where the light sources 30 are arranged, with respect to the reference line Z, and the length Db in the scanning direction of the region on the side where the light sources 30 are not arranged, with respect to the reference line Z are set to satisfy the relationship Da>Db. Furthermore, optical members (the first and second scanning lenses 36 and 37 and the scanning mirrors 38) for guiding the laser beams L reflected on the rotating polygon mirror 33, to the photosensitive drums 1 are arranged to satisfy the following relationship. More specifically, the length La in the scanning direction of the portion on the side where the light sources 30 are arranged, with respect to the reference line Z, and the length Lb in the scanning direction of the portion on the side where the light sources 30 are not arranged, with respect to the reference line Z are set to satisfy the relationship La>Lb. With this configuration, projection amounts L1b and L2b in the +Y direction from the reference line Z in the scanning direction of the above-described optical members can be reduced. Thus, a projection amount Bb in the +Y direction from the reference line Z in the scanning direction of the supporting member 40 can be reduced, so that the length W in the scanning direction of the supporting member 40 can be shortened. This can reduce the material of the supporting member 40 itself to achieve cost saving. Especially in the case of an optical system in which the length I in the scanning direction of the incident optical system is longer than the half of the effective scanned region EA (I>(EA/2)), the effect of shortening the length W in the scanning direction of the supporting member 40 can be easily obtained. In addition, in the case of an optical system in which a length WI in the scanning direction from an end portion of a portion of the optical scanning device 50 that is on the light source side with respect to the reference line Z (a lead pin end of each of the semiconductor lasers 30C, 30K, 30Y, and 30M in FIG. 16) to the reference line Z is longer than the half of the effective scanned region EA (WI>(EA/2)), the effect of shortening the length in the scanning direction of the entire optical scanning device 50 can be easily obtained.

In addition, since a scanner motor 34 is positioned close to the side wall 40a of the supporting member 40 (FIGS. 12 and 16), the amplitude of vibration of the supporting member 40 that is caused by the scanner motor 34 can be reduced, so that degradation in image quality that is caused by vibration can be prevented.

Figure 18A:
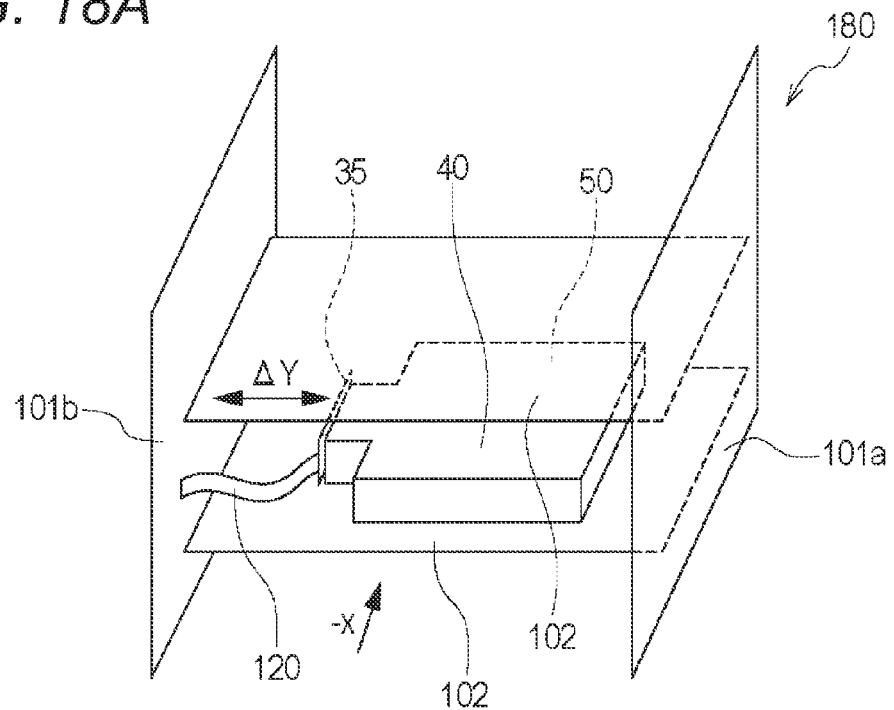
FIGS. 18A and 18B are perspective views illustrating a schematic configuration of a frame member of an image forming apparatus.
Figure 18B:
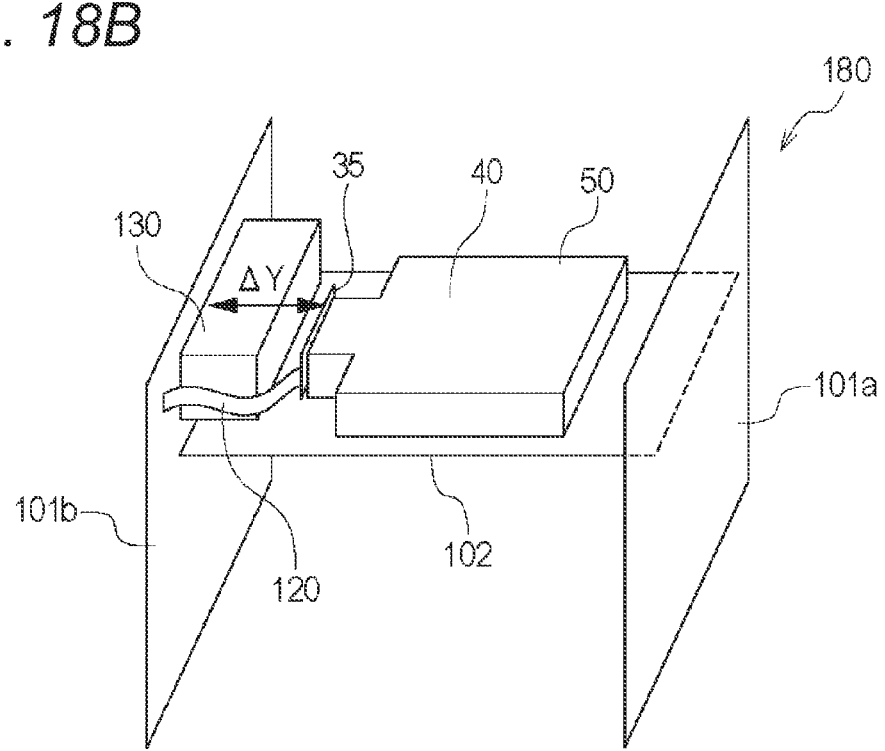

Next, a case of an image forming apparatus 180 will be described. FIGS. 18A and 18B are perspective views illustrating a schematic configuration of a frame member of the image forming apparatus 180. As illustrated in FIG. 18A, the image forming apparatus 180 includes, as a frame member, two side plates (side surface members) 101a and 101b opposed in the scanning direction, and a coupling member 102 for coupling the two side plates 101a and 101b. Each photosensitive drum 1 and the like are supported on the frame member. The supporting member 40 is supported on the coupling member 102.

When the optical scanning device 50 according to the present exemplary embodiment is used in the image forming apparatus 180, a longer distance ΔY between the light sources 30 and the side plate 101b closer to the light sources 30 in the scanning direction can be ensured. Thus, for example, when the optical scanning device 50 is inserted in a −X direction into a space surrounded by two coupling members 102 and the two side plates 101a and 101b to fix the position of the optical scanning device 50 on the frame member, a space used for connecting an electrical cable 120 such as a flat flexible cable (FFC) to the laser driving substrate 35 or the like can be easily secured. In other words, a wider space can be secured between the side plate 101b and the laser driving substrate 35, which is arranged between the supporting member 40 and the side plate 101b. Thus, an operator who connects the electrical cable 120 can perform the connection work even if an opening for accessing the laser driving substrate 35 through the side plate 101b from the opposite side of the side plate 101b is not provided on side plate 101b. Since an opening for accessing the laser driving substrate 35 is not provided, the strength of the side plate 101b can be increased and operation sound generated inside the frame member can be made less likely to leak to the outside. In addition, productivity is expected to be increased by the shortening of work time due to enhanced workability.

In addition, as illustrated in FIG. 18B, if a longer distance ΔY between the light sources 30 and the side plate 101b closer to the light sources 30 in the scanning direction is ensured, the following can be achieved. More specifically, other members used for the image forming apparatus 180 can be arranged in a space between the supporting member 40 and the side plate 101b closer to the light sources 30. For example, a duct member 130 for forming an air path for cooling the image forming apparatus 180 can be arranged between the side plate 101b and the supporting member 40. With such a configuration, a wasted space (dead space) in the image forming apparatus 180 where no component is arranged can be reduced, so that the image forming apparatus 180 itself can be downsized.

Specifically, the present exemplary embodiment can also be applied to a case in which a device has the following configuration. As illustrated in FIG. 14, in the case of an incident optical system in which light beams enter the reflecting surface of the rotating polygon mirror 33 at incident angles θ1 and θ2, the tilt of the reflecting surface of the rotating polygon mirror 33 may cause scanning unevenness (jitter) in a scanning direction. In this case, setting the incident angles θ1 and θ2 to smaller values can suppress the scanning unevenness (jitter). Thus, an optical path length of the incident optical system (distance from the semiconductor lasers 30 to a deflection point D) is set to be longer so as to place collimator lenses 31K and 31C away from the rotating polygon mirror 33. With this configuration, it is considered that the interference between the collimator lenses 31K and 31C is avoided to thereby reduce the incident angles θ1 and θ2. If, however, the optical path length (corresponding to the length I in FIG. 16) of the incident optical system is increased, the length in the scanning direction of the supporting member 40 is accordingly increased. By employing the configuration according to the present exemplary embodiment, the length in the scanning direction of the supporting member 40 can be prevented from being increased.

In addition, in an image forming apparatus including a developing device 4 with large volume, a distance between an optical member (the scanning mirror 38) arranged at the most downstream side on the optical path from the light sources 30 to the photosensitive drums 1 and the photosensitive drums 1 may be set to be longer. In other words, the optical path length of a scanning optical system (distance from the rotating polygon mirror 33 to the photosensitive drums 1) may become longer. In this case, positional errors of various optical members of the incident optical system tend to largely affect positional errors (lateral magnification) of spot images on the photosensitive drums 1 and an image forming accuracy error (longitudinal magnification) (i.e., sensitivity to these errors tends to increase). Thus, it is considered to set the optical path length of the incident optical system (distance from the semiconductor lasers 30 to the deflection point D) to be longer to accordingly increase the focal length of the collimator lenses 31. If, however, the optical path length (corresponding to the length I in FIG. 16) of the incident optical system is increased, the length in the scanning direction of the supporting member 40 is increased. By employing the configuration according to the present exemplary embodiment, the length in the scanning direction of the supporting member 40 can be prevented from being increased.

In addition, in the present exemplary embodiment, among the optical members of the scanning optical system, the scanning mirrors 38 and the second scanning lenses 37 satisfy Conditional Expressions (8) and (9). The optical members of the scanning optical system, however, are not limited to these members. For example, as optical members of the scanning optical system, a diffraction grating, a polarizer such as a wave plate, a polarization beam splitter, a dichroic mirror, and other optical filters may be used, and Conditional Expressions (8) and (9) may be applied to these optical members. In addition, when the supporting member 40 has a plurality of optical members of the scanning optical system, if at least an optical member of the scanning optical system that has the longest length in the scanning direction, or at least an optical member arranged at the most downstream side on the optical path of laser beams emitted from light sources toward scanned surfaces (photosensitive drums) satisfies Conditional Expression (8) or (9), the above-described effect can be obtained.

Sixth Exemplary Embodiment

Figure 17:
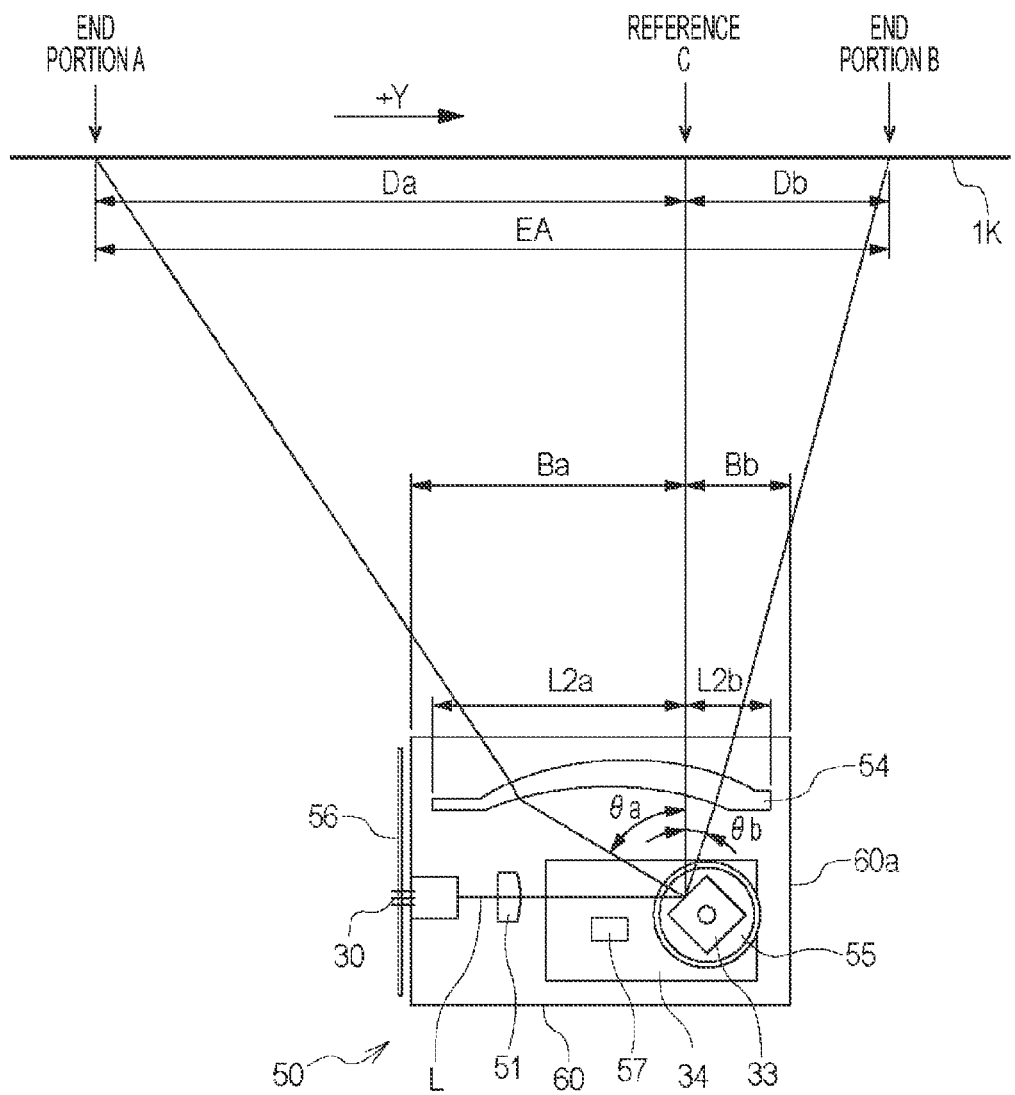
FIG. 17 is a main-scanning cross-sectional view of an optical scanning device according to a sixth exemplary embodiment of the present invention.

A configuration according to the sixth exemplary embodiment will be described with reference to FIG. 17. While the optical scanning device 50 according to the fifth exemplary embodiment is an optical scanning device that can irradiate a plurality of photosensitive members (photosensitive drums) with laser beams, an optical scanning device 50 according to the present exemplary embodiment is an optical scanning device for irradiating a single photosensitive member with laser beams.

Divergent laser beams L are emitted from the semiconductor laser 30 controlled to drive by a laser driving substrate 56 to pass through a compound lens 51 having a function of converting divergent light into parallel light and converging the light in the sub scanning direction. Through the compound lens 51, the laser beams L form images as a line image on the reflecting surface of the rotating polygon mirror 33. Together with a rotor unit 55, the rotating polygon mirror 33 is driven to rotate by the scanner motor 34 to deflect the laser beams L. After being transmitted through a scanning lens 54, the laser beams L form spot images on the surface of the photosensitive drum 1. The direction of scanning performed by the rotation of the rotating polygon mirror 33 is the +Y direction. These optical members are supported on a supporting member 60, and the positions thereof are fixed.

Similarly to the fifth exemplary embodiment, the optical scanning device 50 according to the present exemplary embodiment is set to satisfy the above Conditional Expressions (7) and (9). Furthermore, in the present exemplary embodiment, the rotating polygon mirror 33 and the rotor unit 55 are arranged close to a side wall 60a of the supporting member 60 to such an extent that rotation driving is not affected. In addition, a driving circuit unit 57 provided on a substrate of the scanner motor 34 is provided between the light source 30 and the rotating polygon mirror 33. With this configuration, a projection amount in the +Y direction of the light source 30 from the reference line Z of the scanner motor 34 can be reduced in the scanning direction, so that the length in the scanning direction (Ba+Bb) of the supporting member 60 can be reduced.

[Image Forming Apparatus]

Figure 19:
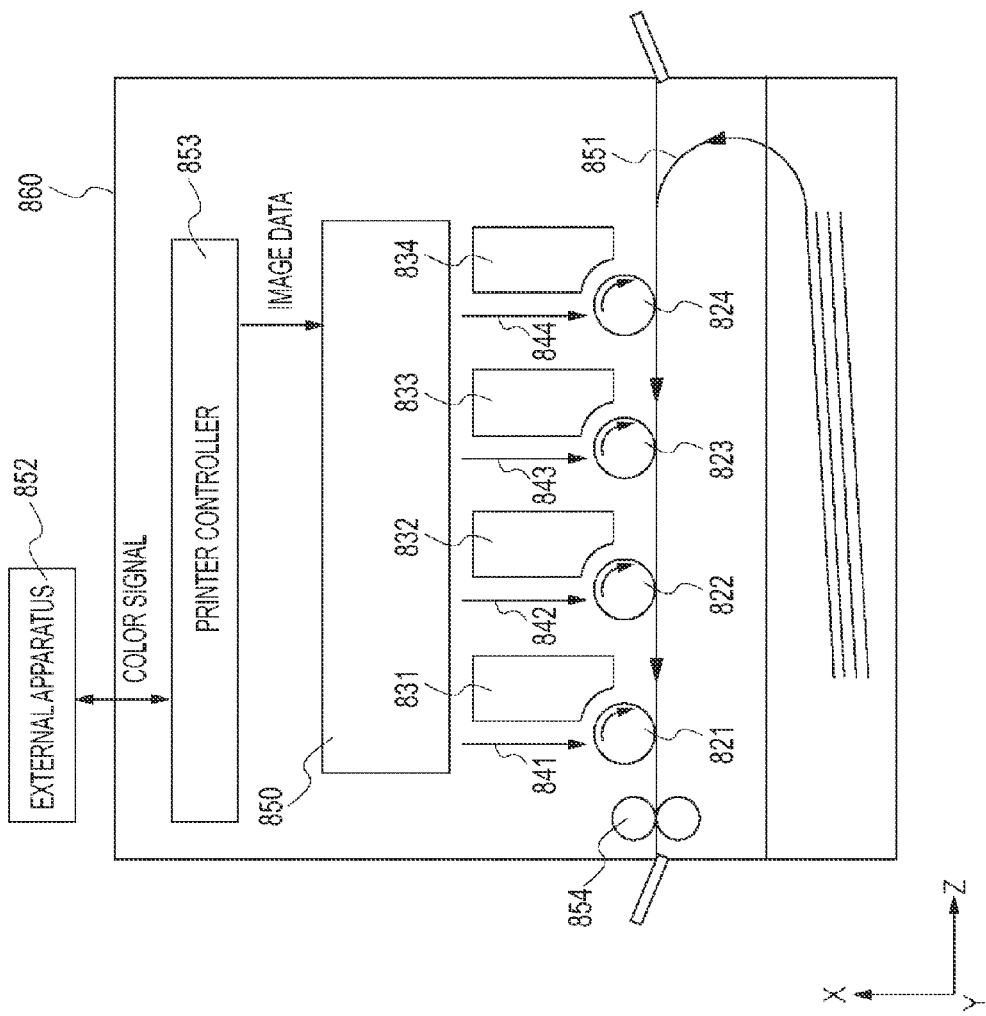
FIG. 19 is a main part schematic view of an image forming apparatus according to an exemplary embodiment of the present invention.

FIG. 19 is a main part schematic view (ZX cross-sectional view) of an image forming apparatus 860 according to an exemplary embodiment of the present invention. The image forming apparatus 860 is a tandem-type color image forming apparatus including an optical scanning device according to any of the above-described exemplary embodiments, and concurrently recording image information onto photosensitive surfaces (scanned surface s) of four photosensitive drums (photosensitive members).

The image forming apparatus 860 includes a printer controller 853, an optical scanning device 850, photosensitive drums 821, 822, 823, and 824 each serving as an image bearing member, developing devices 831, 832, 833, and 834, a conveyance belt 851, and a fixing device 854. The optical scanning device 850 is arranged so that the sub scanning direction corresponds to the Z direction, which is a rotation direction of the photosensitive drums 821 to 824.

As illustrated in FIG. 19, an external apparatus 852 such as a personal computer outputs respective color signals of red (R), green (G), and blue (B). The respective color signals are converted by the printer controller 853 into respective image data (dot data) of yellow (Y), magenta (M), cyan (C), and black (K) to be input to the optical scanning device 850. In addition to the above-described conversion of signals, the printer controller 853 controls each component in the image forming apparatus 860, such as a motor to be described below.

The optical scanning device 850 optically scans the photosensitive surfaces of the photosensitive drums 821 to 824 in the main scanning direction (Y direction) with respective light beams 841, 842, 843, and 844 modulated according to the respective image data. The photosensitive drums 821 to 824 are each rotated clockwise by a motor (not illustrated). In accordance with the rotation, the respective photosensitive surfaces move in the sub scanning direction (Z direction) with respect to the light beams 841 to 844. When the respective photosensitive surfaces charged by charging rollers (not illustrated) are exposed to the light beams 841 to 844, electrostatic latent images are formed on the respective photosensitive surfaces.

Then, the electrostatic latent images of the respective colors that are formed on the respective photosensitive surfaces of the photosensitive drums 821 to 824 are developed by the respective developing devices 831 to 834 as toner images of the respective colors. Subsequently, the toner images of the respective colors are transferred by a transferring device (not illustrated) in a superimposed manner onto a transfer material that has been conveyed by the conveyance belt 851, and then, fixed by the fixing device 854. Through the above-described process, one full-color image is formed.

In addition, the image forming apparatus 860 employs a configuration including an optical scanning device that optically scans four scanned surfaces using a single deflector, as described in the first or third exemplary embodiment. The configuration of the image forming apparatus 860, however, is not limited to this configuration. For example, the image forming apparatus 860 may employ a configuration including four optical scanning devices each optically scanning a single scanned surface using a single deflector, or a configuration including two optical scanning devices each optically scanning two scanned surfaces using a single deflector, as described in the second exemplary embodiment. In addition, for example, a color image reading apparatus including a line sensor such as a charge-coupled device (CCD) sensor and a complementary metal-oxide semiconductor (CMOS) sensor may be connected to the image forming apparatus 860 as the external apparatus 852 to configure a color digital copying machine.

Preferred exemplary embodiments and examples of the present invention have been described above. The present invention, however, is not limited to these exemplary embodiments and examples, and various combinations, modifications, and changes can be made within the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-017856, filed Jan. 30, 2015, No. 2015-074502, filed Mar. 31, 2015, and No. 2015-235238, filed Dec. 1, 2015 which are hereby incorporated by reference herein in their entirety.

What is claimed is:

1. An optical scanning device comprising:
a deflector configured to deflect a light beam to optically scan a scanned region on a scanned surface in a main scanning direction; and
an imaging optical system configured to guide the light beam deflected by the deflector, to the scanned surface,
wherein the imaging optical system includes an imaging optical element in which, in the main scanning direction, a distance to an optical axis from one effective end portion through which a light beam that enters one end portion of the scanned region passes is longer than a distance to the optical axis from another effective end portion through which a light beam that enters another end portion of the scanned region passes, and
wherein, in the imaging optical element, a thickness in an optical axis direction of the one effective end portion is thinner than a thickness in the optical axis direction of the other effective end portion.

2. The optical scanning device according to claim 1, wherein a scanning field angle on a side of the one effective end portion is wider than a scanning field angle on a side of the other effective end portion.

3. The optical scanning device according to claim 1, wherein, in the main scanning direction, the optical axis is positioned on a side of the other effective end portion with respect to a center position of the scanned region.

4. The optical scanning device according to claim 1, further comprising an incident optical system configured to guide a light beam from a light source to the deflector.

5. The optical scanning device according to claim 4, wherein the one effective end portion is an effective end portion on a side of the incident optical system with respect to the optical axis.

6. The optical scanning device according to claim 1, further comprising a light source arranged closer to the optical axis than a position of the one end portion of the scanned region in the main scanning direction.

7. The optical scanning device according to claim 1, wherein a following condition is satisfied:

$$0.6 \times D_A/D_B < \gamma < 1.4 \times D_A/D_B,$$

where, with respect to the optical axis, a half value of a scanning field angle on a side of the one effective end portion is represented by A, a half value of a scanning field angle on a side of the other effective end portion is represented by B, and $\gamma = B/A$, and in the imaging optical element, a thickness in the optical axis direction of the one effective end portion is represented by $D_A$, and a thickness in the optical axis direction of the other effective end portion is represented by $D_B$.

8. The optical scanning device according to claim 1, wherein a following condition is satisfied:

$$0.6 \times d_A/d_B < \gamma < 1.4 \times d_A/d_B,$$

where, with respect to the optical axis, a half value of a scanning field angle on a side of the one effective end portion is represented by A, a half value of a scanning field angle on a side of the other effective end portion is represented by B, and $\gamma = B/A$, and in the imaging optical element, a flange thickness in the optical axis direction of the one effective end portion is represented by $d_A$, and a flange thickness in the optical axis direction of the other effective end portion is represented by $d_B$.

9. The optical scanning device according to claim 1,
wherein the imaging optical element includes a gate portion at either one outer end portion in the main scanning direction, and
wherein a following condition is satisfied:

$$Dd < Dc < De,$$

where, in the optical axis direction, a thickness of the gate portion is represented by Dc, a thickness of an effective end portion on an opposite side to the gate portion with respect to the optical axis is represented by Dd, and a thickness of an effective end portion on a side of the gate portion is represented by De.

10. The optical scanning device according to claim 9, wherein the gate portion is arranged at an outer end portion on a side of the other effective end portion in the imaging optical element.

11. The optical scanning device according to claim 1,
wherein the imaging optical element includes reference portions for positioning the imaging optical element in the optical axis direction, at both outer end portions in the main scanning direction, and
wherein, in the optical axis direction, a length of a reference portion on a side of the one effective end portion is longer than a length of a reference portion on a side of the other effective end portion.

12. The optical scanning device according to claim 1,
wherein the imaging optical element includes a reference portion for positioning the imaging optical element in the main scanning direction, at an outer end portion in a sub scanning direction, and
wherein the reference portion is arranged on the optical axis in the main scanning direction.

13. The optical scanning device according to claim 1, further comprising first and second light sources, and a plurality of the imaging optical systems,
wherein the plurality of imaging optical systems includes a first imaging optical system configured to guide a light beam emitted from the first light source and deflected by a first deflecting surface of the deflector, to a first scanned surface, and a second imaging optical system configured to guide a light beam emitted from the second light source and deflected by a second deflecting surface of the deflector, to a second scanned surface, and
wherein, in the main scanning direction, the first and second light sources are arranged on a side of the one effective end portion with respect to the optical axis.

14. The optical scanning device according to claim 13, wherein a scanning field angle on a side of the one effective end portion is wider than a scanning field angle on a side of the other effective end portion.

15. An image forming apparatus comprising:
the optical scanning device according to claim 1;
a developing device configured to develop, as a toner image, an electrostatic latent image formed on the scanned surface by the optical scanning device;
a transferring device configured to transfer the developed toner image onto a transfer material; and
a fixing device configured to fix the transferred toner image onto the transfer material.

16. An optical scanning device comprising:
a deflector configured to deflect a light beam to optically scan a scanned region on a scanned surface in a main scanning direction; and
an imaging optical system configured to guide the light beam deflected by the deflector, to the scanned surface,
wherein the imaging optical system includes an imaging optical element in which, in the main scanning direction, a distance to an optical axis from one effective end portion through which a light beam that enters one end portion of the scanned region passes is longer than a distance to the optical axis from another effective end portion through which a light beam that enters another end portion of the scanned region passes,
wherein, in the imaging optical element, a thickness in an optical axis direction of the one effective end portion is thinner than a thickness in the optical axis direction of the other effective end portion, and
wherein a following condition is satisfied:

$$0.6 \times D_A/D_B < \gamma < 1.4 \times D_A/D_B,$$

where, with respect to the optical axis, a half value of a scanning field angle on a side of the one effective end portion is represented by A, a half value of a scanning field angle on a side of the other effective end portion is represented by B, and $\gamma = B/A$, and in the imaging optical element, a thickness in the optical axis direction of the one effective end portion is represented by $D_A$, and a thickness in the optical axis direction of the other effective end portion is represented by $D_B$.

17. An optical scanning device comprising:
first and second light sources;
a deflector configured to deflect light beams to optically scan a scanned region on a scanned surface in a main scanning direction;
a first imaging optical system configured to guide a light beam emitted from the first light source and deflected by a first deflecting surface of the deflector, to a first scanned surface; and
a second imaging optical system configured to guide a light beam emitted from the second light source and deflected by a second deflecting surface of the deflector, to a second scanned surface,
wherein each of the first and second imaging optical systems includes an imaging optical element in which, in the main scanning direction, a distance to an optical axis from one effective end portion through which a light beam that enters one end portion of the scanned region passes is longer than a distance to the optical axis from another effective end portion through which a light beam that enters another end portion of the scanned region passes,
wherein, in the imaging optical element, a thickness in an optical axis direction of the one effective end portion is thinner than a thickness in the optical axis direction of the other effective end portion, and
wherein, in the main scanning direction, the first and second light sources are arranged on a side of the one effective end portion with respect to the optical axis.

* * * * *